3,517,071
THREE-DIMENSIONAL POLYCYCLIC BISPHENOL
POLYCARBONATES AND POLYESTERS
John R. Caldwell and Winston J. Jackson, Jr., Kingsport,
Tenn., assignors to Eastman Kodak Company, Rochester, N.Y., a corporation of New Jersey
No Drawing. Original application July 1, 1963, Ser. No. 292,139, now Patent No. 3,317,466. Divided and this application Apr. 14, 1967, Ser. No. 654,286
Int. Cl. C07c *39/16;* C07d *5/32*
U.S. Cl. 260—619                                15 Claims

ABSTRACT OF THE DISCLOSURE

New bisphenols [such as 4,4'-(2-norbornylidene)diphenol, etc.] containing a saturated polycyclic three-dimensional structure which includes a saturated bicyclic atomic-bridged hydrocarbon ring member are disclosed which can be used to prepare new polymers having improved temperature properties and solubility in volatile solvents.

---

This application is a division of Caldwell and Jackson U.S. Ser. No. 292,139; filed July 1, 1963 and now U.S. Pat. 3,317,466, which in turn is a continuation-in-part of Caldwell and Jackson U.S. Ser. No. 137,980, filed Sept. 14, 1961, and now abandoned.

This invention relates to polycarbonates and polyesters from new bisphenols. More specifically, this invention relates to novel thermoplastic polycarbonates and polyesters which are valuable in the production of films, filaments, and shaped articles having excellent high-temperature properties and solubility in low-boiling solvents.

During the past few years many new bisphenol polycarbonates and polyesters have been reported. Polycarbonates have been described by Schnell, Agnew, Chem., 68, 633–660 (1956) and Ind. Eng. Chem., 51, 157–160 (1959). Polyesters have been described by Eareckson, J. Poly. Sc., 40, 399–405 (1959), and other examples are found in many U.S. patents such as 2,035,578 and 2,595,-343 and in various foreign patents such as British Pats. 621,102, 636,429 and 648,513. Compared to these reported polymers, the new bisphenol polycarbonates and polyesters of this invention have appreciably higher softening temperatures, second-order transition temperatures, and heat-distortion temperatures. The new polymers also have higher moduli of elasticity, and they are appreciably more soluble in volatile solvents such as methylene dichloride, chloroform, and benzene. Solubility in these solvents is a distinct advantage, because many of the polymers melt too high to extrude into films or fibers; the films can be obtained, however, by casting from solution and the fibers by wet- or dry-spinning from solution.

The invention has for its principal object to provide novel polycarbonate and polyester compositions which are soluble in low-boiling solvents and which have exceptionally high softening temperatures, second-order transition temperatures, and heat-distortion temperatures.

Another object is to provide novel polycarbonate and polyester compositions which have high moduli of elasticity.

Another object is to provide novel polycarbonate and polyester compositions which are especially adapted to the manufacture of fibers, yarns, films, and other shaped objects having excellent electrical properties and tensile properties at temperatures up to 200° C. and higher.

Other objects will appear hereinafter.

Briefly stated, the invention comprises novel polycarbonates and other polyesters from certain bisphenols and the novel bisphenols. The particular polymers of this invention are condensed from bisphenols in which the bivalent connecting radical of the bisphenol contains a three-dimensional polycyclic structure containing an atomic bridge. In all of the bisphenols which characterize the invention, the two phenol groups are attached to a single carbon atom of the bivalent connecting radical. Bisphenols having this linkage can be called "gem-bisphenols."

The linear polymers of the invention include polyesters of carbonic acid, called polycarbonates, and polyesters of dicarboxylic acids, which can be called dicarboxylic acid polyesters to distinguish them from the polycarbonates.

The diol constituents which characterize the linear polycarbonates and polyesters of the invention are condensation residues of bisphenols having the general formula:

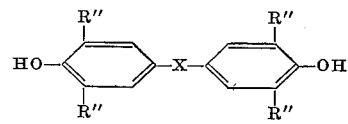

wherein R" is hydrogen, halogen, or alkyl groups ($C_1$ to $C_4$) and X represents a saturated gem-bivalent connecting radical containing a saturated polycyclic structure which includes a bicyclic member containing at least one atomic bridge.

Typical of some three-dimensional polycyclic structures is the norbornane ring. The conventional method of drawing this ring is as follows:

An approximate representation which shows the three-dimensional nature of the ring is as follows:

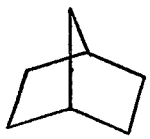

Within the gem-bivalent connecting radical, the single carbon atom to which the two phenol nuclei of the bisphenol are connected may be a carbon within the polycyclic structure, or it may be a

group attached to the polycyclic structure. In 4,4'-(2-norbornylidene)diphenol, the phenolic groups are attached directly to a carbon atom within the polycyclic structure:

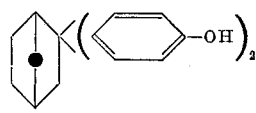

In 4,4'-(2-norbornylmethylene)diphenol, a methylidyne group attached to the polycyclic structure carries the phenolic groups:

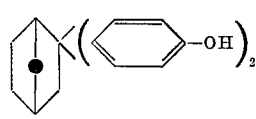

There may be additional saturated rings in the polycyclic structure in addition to the bicyclic member which contains the atomic bridge. These may be joined by fused or spiro-union linkage in the polycyclic structure. Atomic bridges may also occur in the additional member rings of the polycyclic structure. There may be alkyl, halogen, or aromatic substituents in the connecting radical.

The atomic bridge within the polycyclic structure may have more than one carbon atom, e.g., (bicyclo[2.2.2]octane)

There may be more than one bridge in the polycyclic structure: e.g., (tricyclo[2.2.1.0$^{2,6}$]heptane)

(adamantane)

The atomic bridge may consist of an oxygen or nitrogen atom instead of carbon: e.g., (7-oxabicyclo[2.2.1]heptane)

There may be alkyl, aryl and halide substituents on the polycyclic structure: e.g., (substituted norborane)

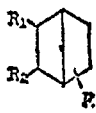

R, R$_1$, and R$_2$=H, halogen, alkyl (C$_1$-C$_4$), and aryl. Also, two substituents may be attached to the same carbon atom. Of course all of these substituents must be in positions which do not interfere with formation of the bisphenol. Because of steric effects, certain bisphenols cannot be obtained, e.g., those from some norbornane derivatives with two alkyl or halogen substituents in the 3 or 7 positions.

Additional saturated rings may be fused to the bicyclic bridged ring member in the polycyclic structure. These may be hydrocarbon or heterocyclic rings, e.g., (hexahydro-4,7-methanoindane)

(octahydro-4,7-methanoisobenzofurane)

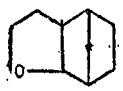

There may be additional bridges in the fused rings, e.g., (decahydro-1,4,5,8-dimethanonaphthalene)

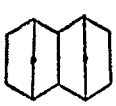

(dodecahydro - 4,9,5,8 - dimethano-1-cyclopenta(b)naphthalene)

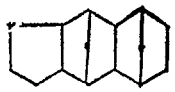

Additional saturated rings may be joined in the polycyclic structure by spiro-union linkage, e.g., (spiro[cyclopropane-1,7'-norbornane])

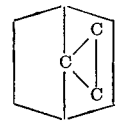

Linear polycarbonates can be prepared by condensation of phosgene or a bischloroformate of a diol, or a mixture of these, with one or more diols including the novel three-dimensional polycyclic bisphenols. It will be apparent that the polycarbonates formed by condensing either phosgene or diol bischloroformates with the same or different diols, can be described as consisting essentially of recurring residues of carbonic acid and the diols. By condensing the bischloroformate of one diol with another diol, homogeneous polycarbonates having regularly recurring residues will be obtained, whereas copolycarbonates will be obtained having randomly recurring residues when a mixture of diols are condensed with phosgene.

Linear dicarboxylic acid polyesters can be prepared by condensation of one or more organic dicarboxylic acids, or dicarboxylic acid diesters, with one or more diols including at least in part one of the polycyclic bisphenols contemplated by the present invention. By whatever condensation process the polyesters are formed they can be described as polymers consisting essentially of condensation residues of dicarboxylic acids and diols.

According to the invention, at least 10 mole percent (preferably at least 35 percent) of the linear condensation polymer is composed essentially of residues of one of the novel bisphenols having a bridged-polycyclic-ring structure in the gem-bivalent connecting radical of the bisphenol. The invention includes mixed polymers, interpolymers, and random copolymers as well as the simpler polymers having as constituents only one acid residue and only one bisphenol residue in recurring groups.

Various polymers of this invention are characterized by having high heat-softening temperatures, high heat-distortion temperatures, high moduli of elasticity, high second-order transition temperatures, and various other unusually valuable properties such as high degree of flexibility, improved stability, solubility in methylene chloride, high melting points, excellent resistance to burning when chlorine is present as a substituent, high impact strength, etc. Not all of these properties are present in the same degree in any given polymer; many of these groups of polymers are clearly distinct from one another. However, the polymers of this invention are generally characterized by having a surprisingly excellent combination of high melting range, high modulus of elasticity, high second-order transition temperature, and high heat-distortion temperature. As a result of this invention, valuable fibers, films, molding plastics and other synthetic resinous materials can be produced.

It would be expected in preparing polycarbonates and polyesters that decreasing the symmetry of a monomer and introducing big bulky side groups would diminish the higher temperature characteristics such as yielding a lower softening range. On the contrary, it has been found that the melting range and other properties of polycarbonates and polyesters derived from bisphenols having polycyclic structures in the connecting groups is increased as the size of the ring system increases.

It surprisingly appears that presence of the bulky group of the polycyclic ring system exerts a chain stiffening effect and also a solubilizing effect. Consequently the polymers are soluble in common organic solvents, yet still have very high melting points, high heat-distortion temperatures, high second-order transition temperatures, etc.

It has been found that in polycarbonates and polyesters containing as little as 10 mole percent of the residue of one of the novel bisphenols there is a significant improvement in the high temperature properties mentioned above.

The invention provides a wide new range of polymers useful for high temperature applications in which previously known resins would not be suitable. From the new polycarbonates and polyesters can be chosen one or several which possess the particular properties needed. For high temperature applications most of the new polycarbonates possess even higher melting ranges, heat-distortion temperatures, and second-order transition temperatures than previously known polycarbonates from bisphenols having aliphatic or cycloaliphatic connecting radicals. The same is true for polyesters from dicarboxylates provided by the invention as compared with known polyesters having otherwise similar properties.

In mixed polycarbonates and polyesters containing a significant proportion of residues of the new polycyclic bisphenols, the high temperature properties are improved considerably more than would be so with other diols, even more than with the known bisphenols. Of course, differences in physical properties exist among the polymers of the invention, depending upon the nature of the acid and diol constituents of the polymer chain and upon the particular novel bisphenol present in the polyester. For instance, the polycarbonates will possess many properties distinctly different from the polydicarboxylate esters, and there will be individual distinct differences in properties among the polycarbonates, or among the polyesters of dicarboxylic acids and the various bisphenols of the invention. However, all of the polymers which contain a significant amount of one of the novel bisphenol residues, exhibit unusually good high temperature properties as mentioned above.

The inherent viscosity of the polymers should be at least as high as 0.4 as measured in chloroform or other suitable solvent. For use in films, particularly for photographic film base, and for fiber applications the polymer should have an inherent viscosity of at least 0.5 ranging upward to about 3.0. For coatings, polymers having inherent viscosities from 0.4 to 0.7 are preferred. Best results with molding or extrusion compositions have been obtained using polymers with inherent viscosities from 0.8 to 1.2.

The bisphenols used in the novel polycarbonates and polyesters of this invention were themselves previously unknown and had to be developed as intermediates to produce the new polycarbonates and polyesters.

PREPARATION OF BISPHENOLS

The bisphenols were prepared by the condensation of phenol or a phenolic derivative with a polycyclic aldehyde or ketone. If the ketone is 2-norbornanone and the phenolic compound is phenol, the reaction is as follows:

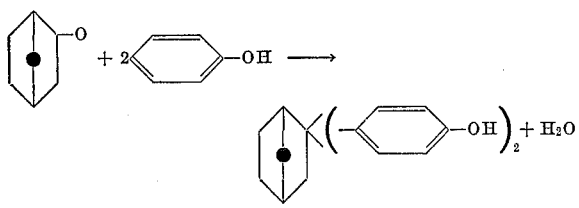

Preparation of a bisphenol by condensation of phenol with acetone is described in U.S. Pat. No. 2,468,982. The procedure there described with various modifications was used in preparing bisphenols in which the phenyl radicals are attached to a single carbon atom within the ring structure, but using a polycyclic ketone rather than acetone for the condensation reaction. Bisphenols in which the phenyl groups are attached to a methylene carbon atom attached to the polycyclic nucleus were prepared by the condensation of a polycyclic aldehyde with a phenolic compound. The condensation reaction in which the ketone or aldehyde condenses is preferably carried out in the presence of HCl, though other acids such as sulfuric, toluenesulphonic, or methionic can be used instead of HCl. The reaction is accelerated by heating and also by adding β-mercaptopropionic acid or methyl mercaptan as a catalyst.

Halogenated bisphenols are obtained in the conventional manner by halogenation. 4,4′(2-norbornylidene)-bis[2,6-dichlorophenol], for example, is obtained by treating the bisphenol in acetic acid with 4 moles of chlorine:

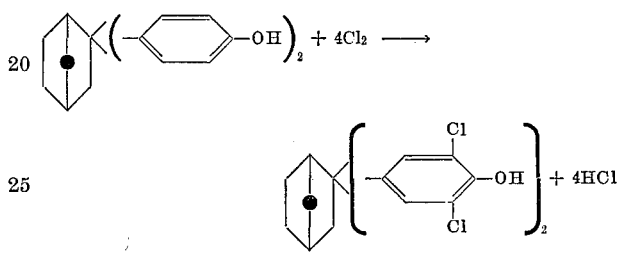

A general procedure for preparing the new bisphenols from polycyclic carbonyl compounds is given in Example 1. A general procedure for chlorinating these bisphenols is given in Example 2. Later examples describe the preparation of the polycyclicaldehydes and ketones, most of which are reported in the literature.

Example 1

General procedure for preparing bisphenols from polycyclic aldehydes and ketones.—To a stirred mixture containing 4.0 moles of the phenolic compound, 5 ml. of 3-mercaptopropionic acid, and 635 ml. of concentrated hydrochloric acid is added 1.0 mole of the polycyclic carbonyl compound. If the carbonyl compound is an aldehyde, it is added slowly so that the temperature of the reaction mixture does not rise above 40° C. Stirring of this mixture is continued several hours until the mixture becomes pasty. It is then allowed to stand overnight. If the carbonyl compound is a ketone (or if the aldehyde is unreactive), the mixture is stirred at 50° C. The reaction is complete when a few drops of the mixture is completely soluble in hot, dilute aqueous sodium hydroxide. If over 12 hrs. is required, the reaction temperature is increased to 75° C. and then, if necessary, until the mixture refluxes.

If the product is crystalline, it is collected on a filter and washed with water. If it is pasty or a hard mass, the aqueous portion is decanted and the residue stirred with hot water or benzene several times to extract the excess phenol. If this treatment is ineffective, the excess phenol compound is removed by steam distillation or distillation under reduced pressure. The crystalline bisphenol is then collected, washed with water, and recrystallized. Most of the bisphenols can be crystallized from aqueous acetic acid or aqueous ethyl alcohol, but ethylene dichloride containing a very small amount of ethyl alcohol is more effective with some bisphenols.

Most of the bisphenols prepared from the polycyclic ketones and phenol (but not substituted phenols) are obtained as hydrates containing one mole of water per mole of bisphenol. A convenient way of obtaining the unhydrated compound is to dissolve the hydrated bisphenol in hot xylene-acetone, remove the water as an azeotrope, and then allow the bisphenol to crystallize.

Although the above procedure for preparing bisphenols is convenient and generally effective, a more rapid reaction is obtained by adding 1 mole of dry HCl to a stirred mixture of carbonyl compound (1 mole), phenolic compound (8 moles), and 3-mercaptopropionic acid (5 ml.) at 50° C. This procedure is particularly useful in the preparation of bisphenols from some of the polycyclic ketones containing large rings. It is also effective in preparing pure bisphenols from aldehydes which tend to give some trisphenol formation (which causes crosslinking).

Example 2

General procedure for chlorinating polycyclic bisphenols.—The bisphenol (0.50 mole) is stirred with 600–800 ml. of acetic acid at 40–50° C. while chlorine is bubbled into the mixture from a lecture bottle. During the chlorine addition the bisphenol goes into solution. After 149 g. (2.1 moles) of chlorine is added, measured as the weight loss of the lecture bottle, the mixture is allowed to cool to room temperature. If crystallization of the product does not take place, the solution is cooled in an ice bath. If crystallization still does not occur, some water is added. The chlorinated bisphenol is then collected, washed with water, and dried. It is recrystallized from aqueous acetic acid or ethylene dichloride.

If the product is noncrystalline and cannot be recrystallized, it is dissolved in alcohol and converted to the disodium salt with sodium methoxide. This salt, obtained by evaporation of the alcohol, is then recrystallized from a mixture of ethyl alcohol and acetone. It can be used in this form for preparing polymers by the interfacial method, or the bisphenol can be regenerated by acidification with acetic acid.

Example 3

4,4'-(2-norbornylidene)diphenols.—Some of these bisphenols may be prepared by the following synthesis:

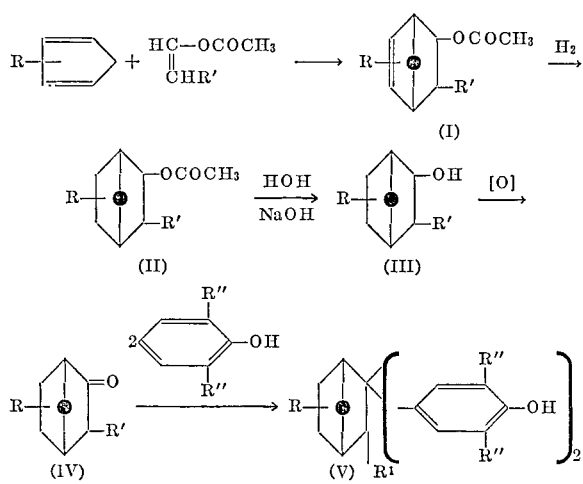

R=hydrogen, or one or more halogen atoms or alkyl groups ($C_1$–$C_4$, iso or normal) or aryl groups
R'=hydrogen, halogen, or alkyl ($C_1$–$C_4$, iso or normal)

The first step is a Diels-Alder addition between cyclopentadiene (or a substituted cyclopentadiene) and vinyl acetate (or a substituted vinyl acetate if a halogen atom or alkyl group is to be substituted in the 3-position of the norbornane ring). After hydrogenation of the double bond, the saturated acetate (II) is hydrolyzed to the carbinol (III) and then oxidized to the ketone (IV). When R and R' are H, the ketone is called norcamphor or 2-norbornanone. Its preparation by the above synthesis is described in Ann., 543 1 (1940). 2-norbornanone also may be prepared by the hydration of norbornene (German Pat. 951,867) followed by oxidation with chromic acid or nitric acid. Example 1 describes the preparation of the bisphenols (V).

4,4'-(2 - norbornylidene)diphenol (V, R=H, R'=H, R''=H) was obtained from aqueous acetic acid and aqueous ethyl alcohol as a monohydrate, M.P. 177–179° C. It also solvated with isopropyl alcohol and with ethylene dichloride when recrystallized from either of these solvents. After the solvent was removed (see Example 1), the unsolvated bisphenol melted at 199–200° C.

4,4'-(2 - norbornylidene)di - o - cresol (V, R''=H and $CH_a$), prepared from norcamphor and o-cresol (Example 1), melted at 218–219° C.

4,4' - (2 - norbornylidene)bis[2,6-dimethylphenol] (V, R''=$CH_3$) melted at 218–220° C.

4,4' - (2 - norbornylidene)bis[2,6-dichlorophenol] (V, R''=Cl), prepared as described in Example 2, melted at 183–184° C. and gave the correct analysis for 4 chlorine atoms per molecule.

4,4'-(2-norbornylidene)bis[2-chlorophenol] (V, R''=H and Cl) was prepared by adding 2 moles of chlorine per mole of bisphenol in the procedure of Example 2. It melted at 163–164° C. and gave the correct analysis for 2 chlorine atoms per molecule.

4,4' - (2 - norbornylidene)bis[2,6-dibromophenol] (V, R''=Br) was prepared by adding 4 moles of bromine at room temperature to 1 mole of the bisphenol dissolved in 500 ml. of methanol. Recrystallized from aqueous acetic acid, the bisphenol melted at 180–181° C. It gave the correct analysis for 4 bromine atoms per molecule.

4,4' - (5- and/or 6 - substituted-2-norbornylidene)diphenols can be prepared according to the following schematic series of reactions:

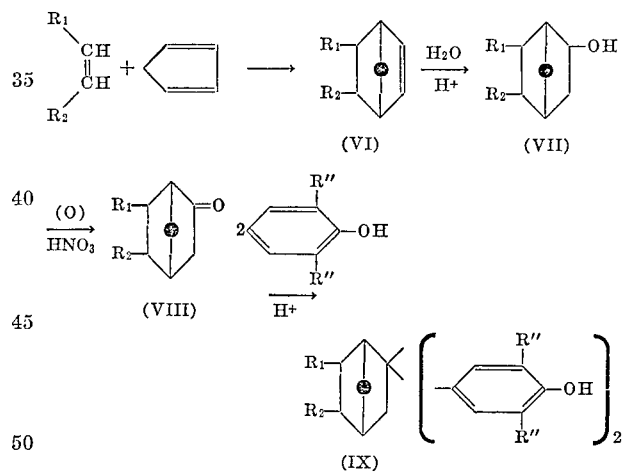

For $R_1$ and $R_2$ see below, R'' is previously defined.

The first step of the reaction consists of a Diels-Alder reaction between a substituted ethylene and cyclopentadiene. This may be accomplished by heating dicyclopentadiene with a substituted ethylene at 200° C. in an autoclave for several hours. The reaction between cyclopentadiene and styrene is described in Ber., 71, 384 (1938). The bicycloheptene (VI) is then hydrated to give the norcamphanol (VII), which is oxidized to the ketone (VIII) with chromic acid or nitric acid. Condensation of a phenol with the substituted norcamphor (VIII) yields the bisphenol (IX) (see Example 1).

Examples of substituted ethylenes which can be employed in this process include propylene, 2-butene, styrene, stilbene, p-chloro-styrene, and other homologous hydrocarbons and chlorinated hydrocarbons containing from 3 to 20 carbon atoms and from none to 6 chlorine atoms.

By employing 2-butene in this synthesis 4,4'-(5,6-dimethyl-2-norbornylidene)diphenol was prepared. When styrene was used, the product was predominantly 4,4'-(5-phenyl-2-norbornylidene)diphenol which was probably in admixture with its isomer with the phenyl radical in the 6-position. In a similar manner, from stilbene was obtained 4,4'-(5,6-diphenyl-2-norbornylidene)diphenol.

Example 4

4,4'-(2 - norbornylmethylene)diphenols.—One systhesis of these bisphenols is as follows:

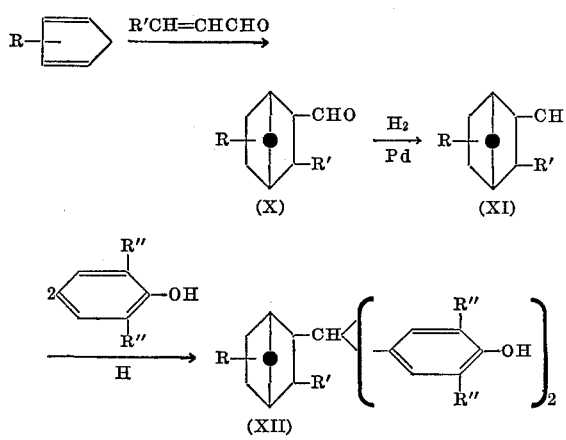

R=Hydrogen or one or several halogen atoms or alkyl groups (methyl, ethyl, propyl, or butyl) or aryl groups R'=Hydrogen, halogen, aryl, or alkyl (methyl, ethyl, propyl, or butyl)

R''=Hydrogen or alkyl (methyl, ethyl, propyl, or butyl). All alkyl substituents may be branched (isopropyl, isobutyl, etc.).

There are two possible stereoisomers (endo and exo) of the bisphenol when R and R' are hydrogen. When R and R' are substituted, cis and trans isomers of the endo and exo structures are possible.

The most convenient method of preparing the Diels-Alder adducts (X) is by heating dicyclopentadiene and $\alpha,\beta$-unsaturated aldehydes in an autoclave at 200° C. for about 1 hr. It is also convenient then to hydrogenate the double bond before removal of the product from the autoclave. Satisfactory hydrogenation conditions consist of room temperature and hydrogen at 500 p.s.i. (5 percent palladium on alumina catalyst). Literature procedures for the preparation of some of the aldehydes are Ann., 460, 119 (1928) and Ann., 470, 67, 92 (1929). The bisphenols were prepared as described in Example 1.

4,4' - (2 - norbornylmethylene)diphenol (XII, R=H, R'=H, and R''=H) melted at 207–208° C.

4,4' - (3 - methyl - 2 - norbornylmethylene)diphenol (XII, R=H, R'=CH$_3$, R''=H) consisted of an isomer (XII, R=H, R'=C$_6$H$_5$) melted at 195–198° C.

4,4' - (3 - phenyl - 2 - norbornylmethylene)diphenol mixture and melted at 222–224° C.

4,4' - (2 - norbornylmethylene)bis[2,6-dichlorophenol] (XII, R=H, R'=H, R''=Cl) prepared as described in Example 2, melted at 166–168° C., and gave the correct analysis for 4 chlorine atoms per molecule.

4,4' - (3 - methyl - 2-norbornylmethylene)bis[2,6-dichlorophenol] (XII, R=H, R'=CH$_3$, R''=Cl) was similarly prepared. It melted at 155–160° C. A chlorine analysis proved that this compound was the tetrachloro derivative.

4,4' - (2 - norbornylmethylene)bis[2,6-dibromophenol] (XII, R=H, R'=H, R''=Br) was prepared by treating 0.5 mole of the bisphenol (XII, R=H, R'=H, R''=H) in 500 ml. of methanol at room temperature with 2 moles of bromine. It melted at 130–133° C.

4,4' - (5 and/or 6 - substituted-2-norbornylmethylene) diphenols can be prepared from intermediate VI of Example 3 by hydroformylation to the aldehyde and then condensation to give the bisphenol:

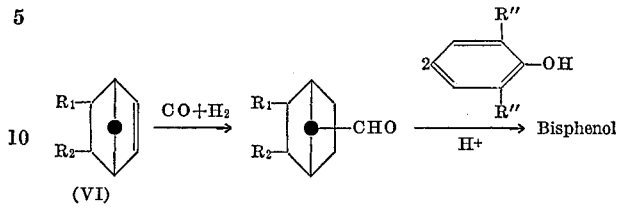

R$_1$, R$_2$, and R'' are previously defined (Example 3). The hydroformylation reactions were carried out by conventional procedures, using dicobalt octacarbonyl catalyst. A similar procedure is described in J. Am. Chem. Soc., 74, 2095 (1952). A detailed procedure is given in Example 10. The bisphenols were prepared as described in Example 1.

Example 5

4,4' - (hexahydro - 4,7 - methanoindan-5-ylidene)diphenols.—These bisphenols may be prepared as follows:

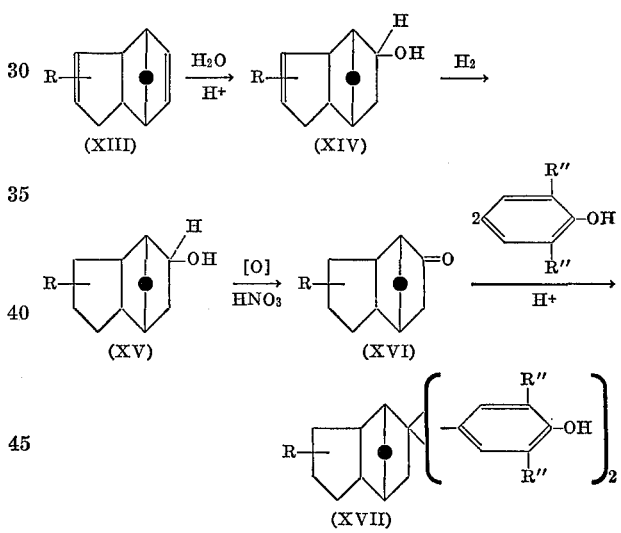

In the above synthesis dicyclopentadiene is the starting material when R=H, but substituted bisphenols may be obtained from substituted dicyclopentadienes when R consists of one or more halogen atoms or aryl groups or alkyl gorups (1 to 4 carbon atoms) in any or all of the polycyclic rings. R'' may be hydrogen or alkyl (1 to 4 carbon atoms). Chlorine and bromine groups may be introduced on the polycyclic rings by treating XIV, XV, or XVI with chlorine or bromine in the presence of ultraviolet light.

Hydration of dicyclopentadiene with 25 percent sulfuric acid by the procedure of Bruson and Riener, J. Am. Chem. Soc., 67, 726 (1945), gave 3a,4,5,6,7,7a-hexahydro-4,7-methanoindan-6-ol (XIV, R=H). The correct structure for this compound was described by Bartlett and Schneider, J. Am. Chem. Soc., 68, 6 (1946). They pointed out that the five-membered ring in XIV was in the exo-position because a Wagner-Meerwein rearrangement took place during the hydration reaction. Hydrogenation of XIV (R=H) gave hexahydro-4,7-methonoindan-5-ol (R=H). Because this product is a solid, it was preferable to carry out the hydrogenation in a solvent. Hexane was used since, after removal of the catalyst, the solution could be used directly in the next reaction (oxidation) without further purification. The saturated carbinol in refluxing hexane was oxidized to hexahydro-4,7-methanoindan-5-one (XVI, R=H) with concentrated nitric acid.

4,4' - (hexahydro - 4,7 - methanoindan-5-ylidene)diphenol (XVII, R=H, R''=H), obtained as described in Example I, was solvated with one mole of water when recrystallized from aqueous ethyl alcohol or aqueous acetic acid. It melted at 221–223° C. after losing its water of hydration.

4,4' - (hexahydro - 4,7 - methanoindan-5-ylidene)di-o-cresol (XVII, R''=H and $CH_3$), obtained from XVI and o-cresol, melted at 208–210° C.

4,4' - (hexahydro - 4,7 - methanoindan-5-ylidene)bis [2,6 - dichlorophenol] (XVII, R''=Cl) was prepared by chlorination of XVII (R''=H) as described in Example 2. After purification by the disodium salt method of Example 2, it melted at 100° C. and gave the correct analysis for 4 chlorine atoms per molecule.

4,4' - (hexahydro - 4,7 - methanoindan-5-ylidene)bis [2,6 - dibromophenol] (XVII, R''=Br) was prepared by treating one mole of the bisphenol suspended in 1200 ml. of methanol at room temperature with 4 moles of bromine. It melted at 116–118° C. and gave the correct analysis for 4 bromine atoms per molecule.

Example 6

4,4' - (dodecahydro - 4,9,5,8 - dimethano-1-cyclopenta(b)naphthalen - 6 - ylidene)diphenols.—These bisphenols may be prepared as follows:

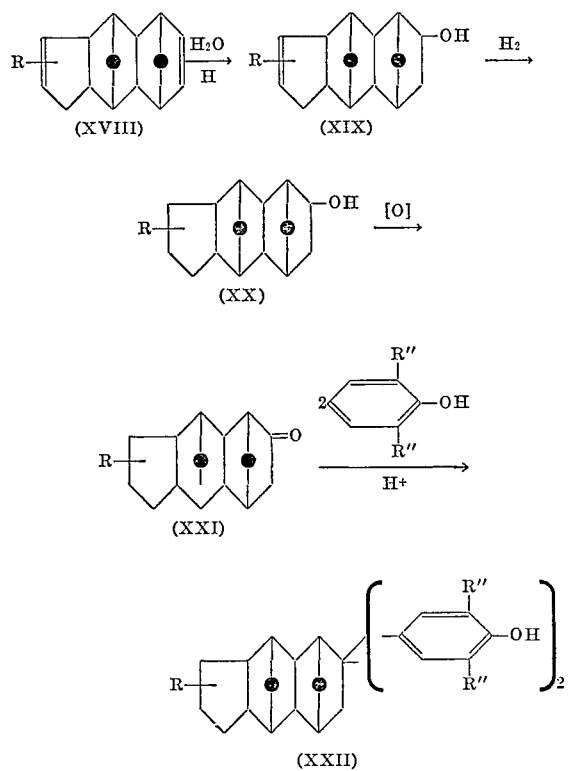

R may be hydrogen or one or more halogen atoms or aryl groups or alkyl groups (1 to 4 carbon atoms) in any or all of the polycyclic rings. R'' is previously defined.

Hydration of tricyclopentadiene (XVIII, R=H) is described in J. Am. Chem. Soc., 67, 728 (1945), but a higher yield of XIX is obtained by the method in J. Am. Chem. Soc., 69, 1827 (1947). The remainder of the synthesis may be carried out by the same procedures used in preparing XVII in Example 5. When R and R'' were H the bisphenol melted at 210–215° C.

Example 7

4,4 - (decahydro - 1,4:5,8 - dimethanonaphth-2-ylidene) diphenols.—The synthesis of exo-endo isomers of this class of bisphenols is as follows:

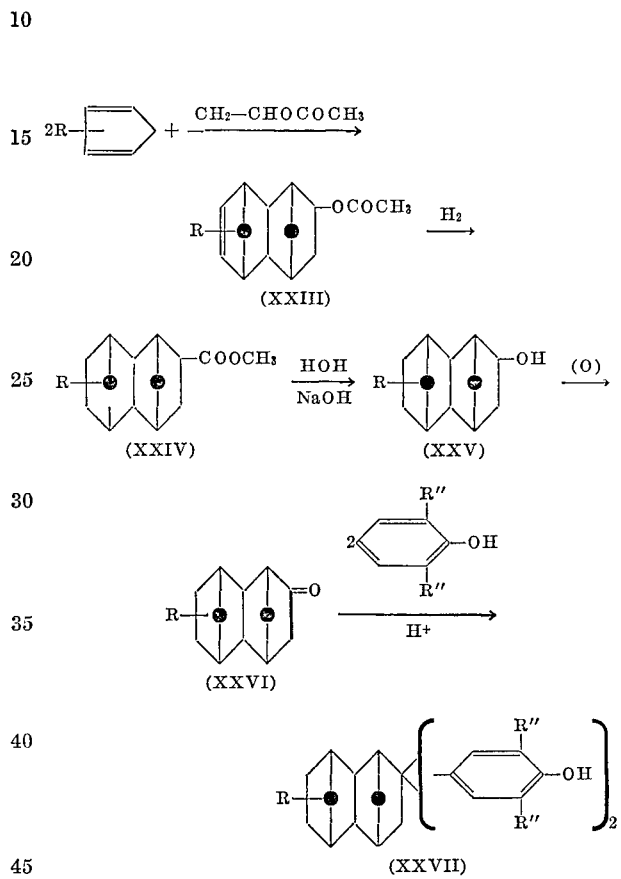

The synthesis of the ketone (XXVI) is described in Ann., 543, 20–21 (1940). The exo-endo ring structure is assumed to be the same as that of the carbinol (XXV), which was proved by Soloway, J. Am. Chem. Soc., 74, 1027 (1952). Example 1 gives a general procedure for preparing the bisphenols. Substituted bisphenols may be obtained by starting the synthesis with a substituted cyclopentadiene in which R is one or more halogen atoms, aryl groups, or alkyl groups. Intermediates XXIII, XXIV, XXV, and XXVI also may be halogenated by treating with bromine or chlorine in the presence of ultraviolet light.

4,4'-(decahydro-1,4-exo - 5,8' - endo-dimethanonaphth-2-ylidene)diphenol (XXVII, R and R''=H) was solvated with water when recrystallized from aqueous ethyl alcohol. The bisphenol melted at 244–245° C. after losing its water of hydration.

4,4'-(decahydro - 1,4 - exo-5,8-endo-dimethanonaphth-2-ylidene)di-o-cresol (XXVII, R''=H and $CH_3$), obtained from XXVI (R=H) and o-cresol, melted at 212–214° C.

4,4'-(decahydro-1,4-exo - 5,8 - endo-dimethanonaphth-2-ylidene)bis[2,6-dichlorophenol] (XXVII, R''=Cl), prepared from XXVII (R and R''=H) and chlorine as described in Example 2, gave the correct analysis for 4 chlorine atoms per molecule.

The synthesis of exo-exo isomers of this class of bisphenols is as follows:

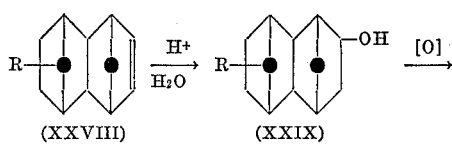

(XXVIII)   (XXIX)

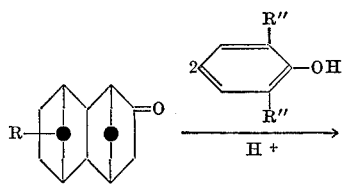

(XXX)

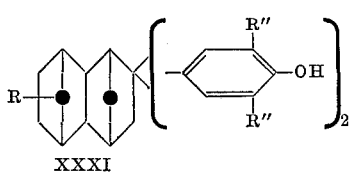

XXXI

R and R″ are previously defined.

The preparations of XXVIII and XXIV when R=H are described in J. Am. Chem. Soc., 74, 1029 (1952) and are designated therein as Ib and III, respectively. The same paper describes the exo-exo arrangement of the rings in XXIX. Ketone XXX is conveniently obtained by treating XXIX in refluxing hexane with concentrated nitric acid. The ketone distils at 118° C./3 mm. The bisphenols are prepared by the method of Example 1.

4.4′-(decahydro-1,4-exo - 5,8 - exo-dimethanonaphth-2-ylidene)diphenol (XXXI, R and R″=H) was obtained as a hydrate which melted at 140–143° C.

Example 8

4,4′-(decahydro - 1,4:5,8 - dimethanonaphth-2-ylmethylene) diphenols.—The synthesis of these bisphenols is as follows:

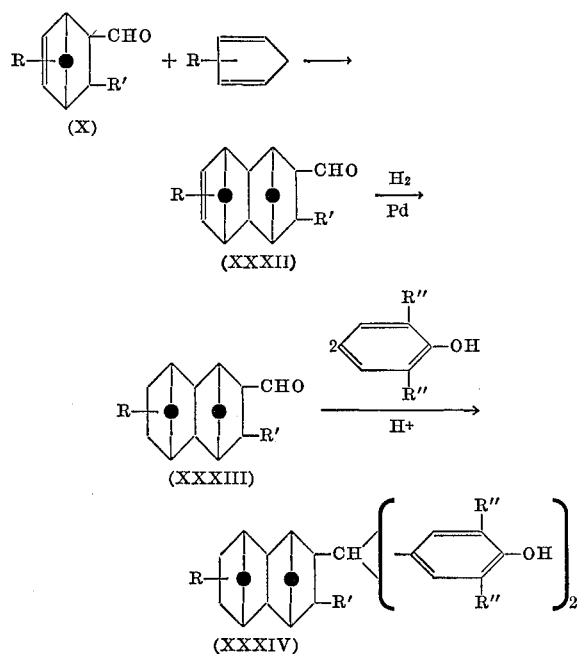

R, R′, and R″ are the same as in XII.

If R′ is H, 8 stereoisomers are possible. More are possible when R′ is not H.

Aldehyde XXXII (R and R′=H) was prepared by a procedure similar to that given in Ber., 71, 2413 (1938). The product, which contained some tricyclopentadiene (gas chromatogram), was reduced to the saturated aldehyde at room temperature with hydrogen (500 p.s.i.) and 5 percent palladium on alumina catalyst. It distilled at 110–112° C./2 mm.

4,4′-(decahydro-1,4:5,8-dimethanonaphth - 2 - ylmethylene)diphenol (XXXIV, R=H, R′=H, R″=H), prepared by the method of Example 1, crystallized from aqueous ethyl alcohol as a hydrate melting at 218–219° C. after loss of its water.

4,4′-(decahydro - 1,4:5,8 - dimethanonaphth-2-ylmethylene)bis[2,6-dichlorophenol] (XXXIV, R″=Cl), prepared by chlorination of the above bisphenol by the method of Example 2, gave the correct analysis for 4 chlorine atoms per molecule.

Example 9

4,4′ - (hexahydro-4,7-methanoindan-5-ylmethylene)diphenols.—These bisphenols may be prepared as follows:

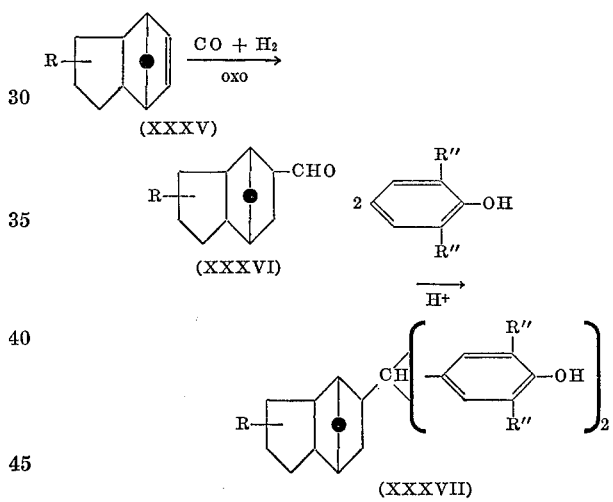

R and R″ are previously defined.

1,2-dihydrodicyclopentadiene (XXXV, R=H) was prepared by the Diels-Alder reaction between cyclopentene and dicyclopentadiene (which cracked to cyclopentadiene) at 198° C. This compound, endo-1,2-dihydrodicyclopentadiene, is described in J. Am. Chem. Soc., 82, 2361 (1960). This paper also describes the preparation of the exo derivative, which after the oxo reaction, can be used to give a different bisphenol isomer. As indicated, XXXVI (R=H) was prepared by hydroformylation. It boiled at 106–110° C./3 mm. The procedure was similar to that in U.S. Pat. 2,850,536, which describes the hydroformylation of dicyclopentadiene. Another similar hydroformylation procedure is described in detail in the next example.

4,4′ - (hexahydro-4,7-methanoindan-5-ylmethylene)diphenol (XXXVII, R and R″=H), prepared by the method of Example 1, melted at 212–214° C. after recrystallization from acetic acid.

4,4′ - (hexahydro - 4,7-methanoindan-5-ylmethylene)-bis-[2,6-dichlorophenol] (XXXVII, R″=Cl), prepared by the method of Example 2, gave the correct analysis for 4 chlorine atoms per molecule.

Example 10

4,4′-(hexahydro-4,7-methanoindan-2(or 3)-ylmethylene diphenols.—These bisphenols may be prepared as follows:

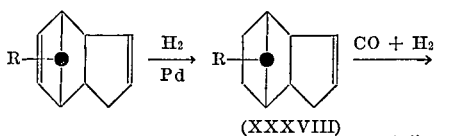

(XXXVIII)

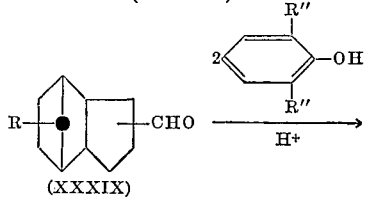

(XXXIX)

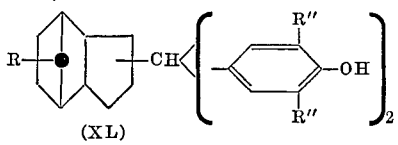

(XL)

R and R″ are previously defined.

When R=H the starting material is dicyclopentadiene. The active double bond of dicyclopentadiene was hydrogenated to yield XXXVIII, and this product was hydroformylated (oxo reaction) to yield aldehyde XXXIX. Specific procedures follow:

To a stirred mixture (magnetic stirrer) containing 264 g. (2.0 moles) of distilled dicyclopentadiene and 5 g. of 5 percent palladium or alumina in 300 ml. of ethanol was added hydrogen (45 p.s.i.) at room temperature until two moles was taken up. The product, dihydrodicyclopentadiene, was filtered from the catalyst and distilled, B.P. 178–179° C. An autoclave was charged with 156 grams of dihydrodicyclopentadiene in 500 ml. of benzene, and 3 g. of dicobalt octacarbonyl was added. After the autoclave was purged with nitrogen, hydrogen (800 p.s.i.) and then 1:1 hydrogen-carbon monoxide (2000 p.s.i.) were pressed in. The mixture was heated to 150° C., and the pressure was held at 3000 p.s.i. with 1:1 hydrogen-carbon monoxide. After two hours, the mixture was cooled, filtered, and flash-distilled. When redistilled, the product, hexahydro-4,7-methanoindan-2(or 3)-carboxaldehyde, boiled at 107–113° C./4 mm. $n_D^{20}$ 1.5082.

4,4′ - (hexahydro-4,7-methanoindan-2(or 3)-ylmethylene) diphenol (XL, R and R″=H), prepared by the method of Example 1 and recrystallized from aqueous acetic acid, melted at 220–230° C. It consisted of an isomer mixture.

4,4′ - (hexahydro-4,7-methanoindan-2(or 3)-ylmethylene)-bis[2,6-dichlorophenol] (XL, R″=Cl), prepared by the method of Example 2, gave the correct analysis for 4 chlorine atoms per molecule.

Example 11

4,4′ - (hexahydro - 4,7 - methanoindan - 1-ylidene)diphenols.—These bisphenols may be prepared as follows:

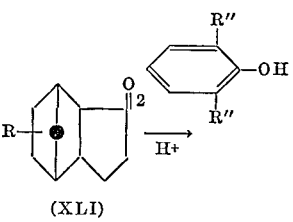

(XLI)

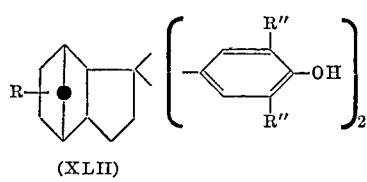

(XLII)

R and R″ are previously defined.

When R is H the preparation of the ketone is given in Monatshefte 85, 154 (1954); there are two possible stereoisomers having endo and exo structures, and if R is not hydrogen then isomers having cis and trans structures exist. This observation obviously also applies to other examples in this specification. When R and R″=H the bisphenol, prepared by the method of Example 1, melted at 213–215° C.

Example 12

4,4′ - (octahydro-4,7-methanoisobenzofuran-6-ylidene) diphenols.—The synthesis of the bisphenols is as follows:

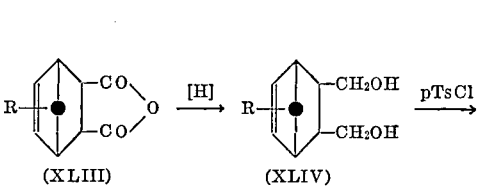

(XLIII)     (XLIV)

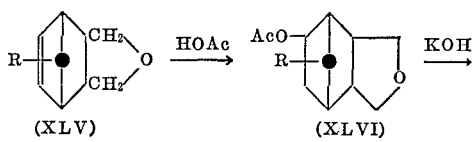

(XLV)     (XLVI)

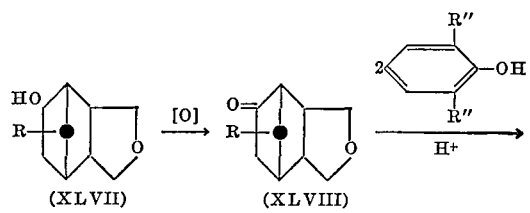

(XLVII)     (XLVIII)

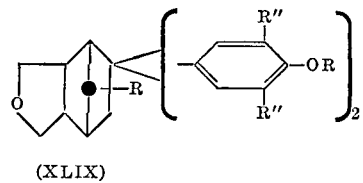

(XLIX)

R and R″ are previously defined.

The synthesis of the endo and exo isomers of ketone XLVIII when R=H is described by Culbertson Seward, and Wilder in J. Am. Chem. Soc., 82, 2541–7 (1960). The starting material (XLIII) is the maleic anhydride adduct of cyclopentadiene. It is obtained as the endo isomer. It can be rearranged thermally, as described in the paper, to give the exo isomer, which is used to synthesize the exo bisphenol. (The endo bisphenol, of course, is obtained from the endo Diels-Alder adduct.)

4,4′ - (octahydro-4,7-methanoisobenzofuran-6-ylidene) diphenol (XLIX, R and R″=H), prepared from the endo ketone (XLVIII) by the method of Example 1, melted at 215–218° C.

4,4′ - (octahydro-4,7-methanoisobenzofuran-6-ylidene) bis-[2,6-dichlorophenol] (XLIX, R″=Cl) was prepared from the above bisphenol by the method of Example 2. It was purified by recrystallizing its disodium salt from a mixture of ethyl alcohol and acetone and then regenerating the bisphenol with acetic acid.

Example 13

4,4' - (bicyclo[3.2.1]oct-2-ylidene)diphenols. — These bisphenols may be prepared as follows:

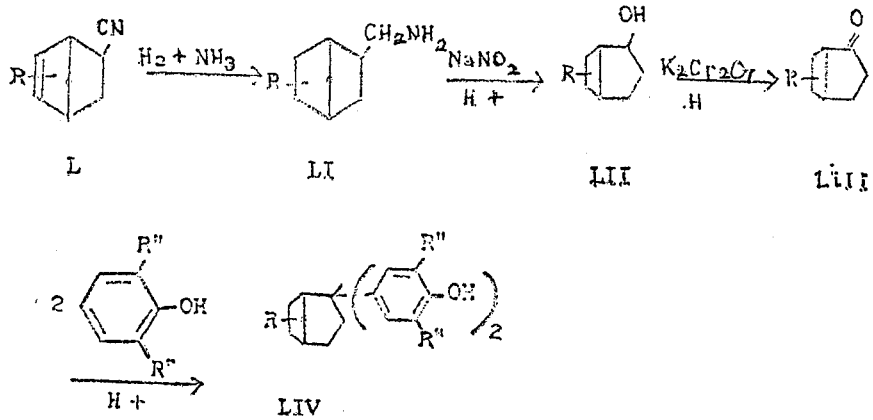

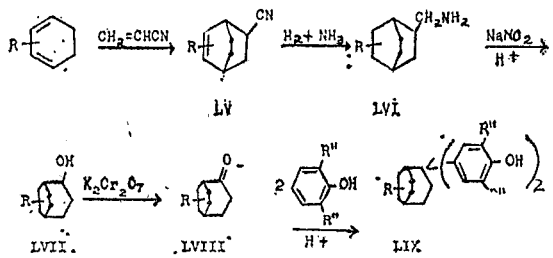

R and R" are previously defined.

The unsaturated nitrile (L) is obtained by the Diels-Alder reaction between cyclopentadiene or a substituted cyclopentadiene and acrylonitrile. Hydrogenation in the presence of ammonia yields the saturated amine (LI). The preparations of these two compounds when R=H are described in Ber. 88, 152 (1955). When the amine is treated with nitrous acid, the ring expands and bicyclo[3.2.1]octan-2-ol (LII, R=H) is obtained. Oxidation with potassium dichromate converts it to the ketone (LIII). The preparations of the carbinol and ketone are described in Ber. 71, 2407 (1938).

4,4'-(bicyclo[3.2.1]oct-2-ylidene)diphenol (LIV, R and R"=H), prepared by the method of Example 1, melted at 204–207° C.

4,4' - (bicyclo[3.2.1]oct-2-ylidene)bis[2,6 - dichlorophenol](LIV, R"=C) was prepared from the above bisphenol by the method of Example 2.

Example 14

4,4' - (bicyclo[3.2.2.]non-2-ylidene)diphenols.—These bisphenols may be prepared as follows:

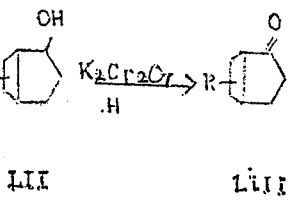

R and R" are previously defined.

The unsaturated nitrile (LV) is obtained by the Diels-Alder reaction between cyclohexadiene or a substituted cyclohexadiene and acrylonitrile. Hydrogenation in the presence of ammonia yields the saturated amine (LVI). When this compound is treated with nitrous acid, the ring expands and a bicyclo[3.2.2.]nonan-2-ol (LVII) is obtained. When R=H these preparations are described in Ber. 88, 153 (1955). Oxidation with potassium dichromate converts the carbinol to ketone (LVIII).

4,4'-(bicyclo[3.2.2.]non-2-ylidene)diphenol (LIX, R and R"=H), prepared by the method of Example 1, melted at 218–220° C.

4,4' - (bicyclo[3.2.2.]non-2-ylidene)bis[2,6 - dichlorophenol] (LIX, R"=Cl) was prepared from the above bisphenol and chlorine by the method of Example 2. A chlorine analysis proved that this compound was the tetrachloro derivative.

Example 15

4,4' - (bicyclo[2.2.2]oct-2-ylmethylene)diphenols. — These bisphenols may be prepared as follows:

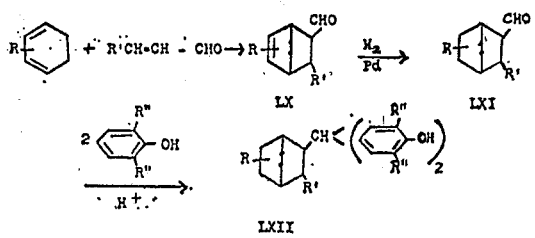

R, R', and R" are the same as in Example 4.

The Diels-Alder adduct LX is obtained by condensing cyclohexadiene or a substituted cyclohexadiene with an α,β-unsaturated aldehyde. Catalytic hydrogenation of the double bond gives the saturated aldehyde (LXI). The preparation of these two compounds when R equals H is described in J. Am. Chem. Soc. 74, 3001 (1952).

4,4' - (bicyclo[2.2.2]oct-2-ylmethylene)diphenol (LXII, R=H, R"=H), prepared by the procedure of Example 1, melted 224–226° C.

4,4' - (bicyclo[2.2.2]oct - 2 - ylmethylene)bis[2,6 - dichlorophenol] (LXII, R"=Cl) was prepared by chlorination of the above bisphenol by the procedure of Example 2.

Example 16

4,4' - (spiro[cyclopropane-1,7'-norborn - 2' - yl]methylene)diphenols.—These bisphenols may be prepared as follows:

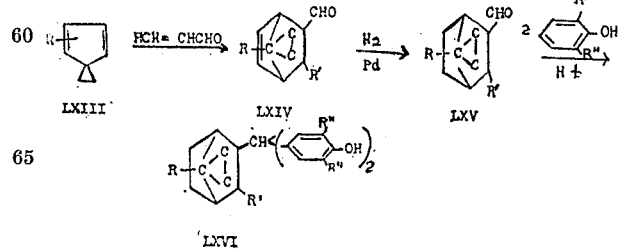

R and R" are previously defined.

Preparation of spiro(cyclopropanecyclopentadiene) (LXIII, R=H) is described by Alder et al. in Ber. 93, 1892 (1960). A Diels-Alder reaction between this compound and an α,β-unsaturated aldehyde yields the adduct (LXIV). The saturated cyclic aldehyde (LXV) is obtained by catalytic reduction of the double bond. Bisphenols are obtained by stirring an aldehyde with a phenol in an acidic medium. Detailed procedures follow:

Spiro[cyclopropanecyclopentadiene] was heated on a steam bath with an equimolar amount of acrolein for 12 hours. Distillation yielded the Diels-Alder adduct, B.P. 80–84° C./16 mm. The double bond was reduced by placing 200 g. of the adduct in an autoclave with 5 g. of 5 percent palladium on alumina and hydrogenating at room temperature and 500 p.s.i. The catalyst was removed by filtration, and the saturated aldehyde (LXV, R=H) was used to prepare the bisphenol by the method of Example 1. It melted at 212–215° C.

Example 17

4,4' - (tricyclo[2.2.1.0$^{2,6}$]heptan - 3 - ylidene)diphenols.—These bisphenols may be prepared as follows:

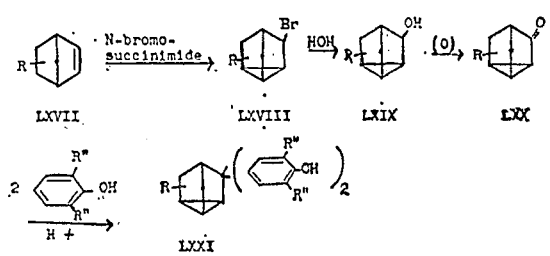

R and R'' are previously defined.

When a norbornene (LXVII) is treated with N-bromosuccinimide, a rearrangement takes place and the 3-bromonortricyclene (LXVIII) is obtained. The bromo group is hydrolyzed to form the hydroxy compound (LXIX), which is then oxidized to the ketone (LXX). The ketone is then treated with a phenol by the method of Example 1 to form the bisphenol. When R and R''=H, the bisphenol melted at 211–212° C. after recrystallization from ethylene dichloride containing a small amount of ethyl alcohol.

The preparation of the ketone (LXX) from 2-norbornene when R equals H is described by Roberts and co-workers (J. Am. Chem. Soc., 72, 3123 (1950)). The article also gives the structure of the ketone (p. 3117) of which LXX is a planar representation. It is referred to as "nortricyclanone" by Roberts and "tricyclo[2.2.1.2,6]heptan-3-one" by Chemical Abstracts. When R=H, a simpler synthesis begins with norbornadiene (LXXII):

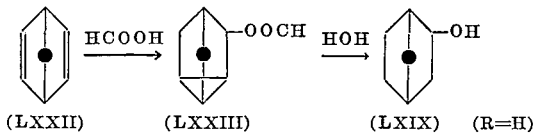

The preparation of the above carbinol by this method is described by Schmerling and co-workers [J. Am. Chem. Soc., 78, 2821 (1956)]. During the addition of formic acid to norbornadiene, rearrangement occurs and the formate (LXXIII) is obtained. This may then be hydrolyzed to the carbinol, which is oxidized to the ketone (LXX, R=H) as before.

4,4' - (tricyclo[2.2.1.0$^{2,6}$]heptan - 3 - ylidene)bis[2,6-dichlorophenol] was prepared by chlorination of the above bisphenol by the procedure of Example 2.

BISPHENOL POLYCARBONATES

Polycarbonates from bisphenols may be prepared by adding phosgene and/or a bischloroformate of a diol, to a cooled, stirred aqueous mixture containing sodium hydroxide, the bisphenol, a catalyst, and methylene chloride. On further stirring the polymer builds up in the methylene chloride phase.

A bisphenol (residue shown by —O—B—O—) and phosgene give recurring structural units in the polymer of:

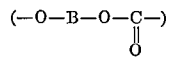

A bisphenol and a dischloroformate of a diol (residue shown by

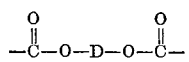

give recurring structural units of:

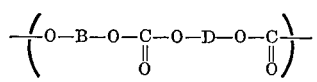

The diol from which the bischloroformate is prepared may be aromatic, aliphatic, or alicyclic, and may be primary, secondary, or tertiary. The carbon chain of aliphatic diols may be straight, or branched and may contain from 2 to 20 carbon atoms. Examples of diols are ethylene glycol; 1,6-hexanediol; 1,4-hexanediol; 1,4-cyclohexanedimethanol; p-xylylenediol; 2,5-norbornanediol; trans-1,4-cyclohexanediol; 2,5 - dimethyl-2,5-hexanediol; hydroquinone; and 4,4'-isopropylidenediphenol. Also any of the following groups may be present in the molecule (R=alkyl or aryl): —R$_2$C—, —O—, —OCH$_2$CH$_2$O—, —S—, —SO—, —SO$_2$—, —SO$_2$NR—, —NR—,

—CONH—

—CO—, —COO—, CF$_2$, —NRNR—, —CH=CH—, —C=C—, phenylene, cyclohexylene, etc.

Bischloroformates of aliphatic and alicyclic diols may be prepared by adding an excess of phosgene to the diol suspended in ethylene dichloride. If the diol reacts very slowly, some dry dixoane is also added to increase its solubility in the medium. After all of the diol has been dissolved, dry air is passed in until all of the hydrogen chloride and excess phosgene has been swept out. The bischloroformate solution may then be used as needed in the polymerization reactions.

Bischloroformates of aromatic diols, including bisphenols, may be prepared by simultaneously adding the diol (dissolved in dioxane) and dimethylaniline to a stirred solution of phosgene in toluene. A similar procedure is described in British Patent 613,280.

When a bischloroformate is added to the reaction mixture, the molar amount of the bisphenol preferably should be equal or in slight excess (5 mole percent). When phosgene and a bischloroformate are both added, or the phosgene alone is used, the phosgene preferably should be 5 to 10 mole percent in excess of its equivalent bisphenol in the reaction mixture.

A quaternary ammonium salt or hydroxide increases the rate of polymerization. This may also be accomplished with certain tertiary amines, such as tri-n-butyl amine, which is preferred.

The optimum temperature range is 15–25° C. At lower temperatures a longer reaction time is required. At higher temperatures hydrolysis tends to lower the inherent viscosity of the polymer product.

Depending upon the catalyst used, the normal reaction time to obtain a maximum molecular weight product will be from 10 minutes to 2 hours. Reaction rate is slower if impure reactants are used or if catalyst is not used. Longer reaction time permits hydrolysis which tends to lower the molecular weight. At the end of the reaction time the alkali present must be neutralized with acetic, hydrochloric, or other acid.

After the reaction is completed, the polymer layer is diluted by adding methylene chloride and then is washed thoroughly with water. The polymer can be precipitated by slowly pouring the methylene chloride phase into methanol, hexane, or other non-solvent.

In addition to the interfacial process, just described, for preparing the polycarbonates of this invention, these polymers may also be prepared by adding phosgene and/ or a diol bischloroformate to a stirred mixture containing the bisphenol and a tertiary amine, such as pyridine or triethylamine. A portion of the tertiary amine may be replaced with a solvent for the polymers, such as methylene chloride. In contrast to the interfacial process, in this process it is not necessary to add nonaromatic diols in the form of their bischloroformates—the diols themselves may be added. Copolycarbonates are then obtained when phosgene is added to the bisphenol/diol mixture in the tertiary amine.

These polycarbonates also may be prepared by the ester interchange process, that is, by heating the bisphenol, a diaryl carbonate, and a suitable catalyst under reduced pressure. Satisfactory diaryl carbonates include diphenyl carbonate, ditolyl carbonate, dixylyl carbonate, and dinitrophenyl carbonate. Catalysts include the oxides, hydrides, and hydroxides of alkali metals and alkaline earth metals and also the free alkali and alkaline earth metals. Other suitable catalysts include butyl lithium, phenyl lithium, zinc oxide, lead oxide, dibutyltin oxide, and sodium aluminate. The usual method is followed of heating the reactants under reduced pressure to remove the phenolic compound as the condensation proceeds. Required temperatures are 250–350° C. It is preferred to build up final molecular weight by the solid-phase process in which the granulated polymer is heated under reduced pressure (preferably below 1 mm. of mercury) at a temperature somewhat below its melting point. Experimental procedures are similar to those given under the section entitled "Preparation of Bisphenol Polyesters" wherein diaryl esters of dicarboxylic acids are used instead of diaryl carbonates.

The polycarbonates of this invention include copolymers. Copolycarbonates are prepared by condensing a mixture of more than one bisphenol with phosgene or a diol bischloroformate or a diaryl carbonate, or of a bisphenol with a mixture of more than one diol bischloroformate. Block copolycarbonates are prepared by condensing a mixture of low-molecular weight homopolycarbonates with phosgene. Mixed copolymers are prepared by condensing a bisphenol with a bischloroformate of a polymeric diol (e.g. polyethylene oxide bischloroformate).

Bisphenols which may be used with the bisphenols of this invention for preparing copolycarbonates include 4,4'-isopropylidenediphenol (also known as bisphenol A), 4,4'-isopropylidenebis[2,6-dichlorophenol], 4,4' - isopropylidenebis[2,6-dibromophenol], cyclohexylidenediphenol, cyclohexylmethylenediphenol, 4,4'-sulfonyldiphenol, 4,4'-oxydiphenol, 4,4'-dihydroxyphenyl, 4,4'-methylenediphenol, hydroquinone, resorcinol, 1,4-naphthalenediol, 2,5-naphthalenediol, and other bisphenols listed in U.S. Pat. 3,030,335.

A general procedure for preparing the new polycarbonates from polycyclic bisphenols and phosgene by the interfacial method is given in Example 18. This method was used for most of the polymers. These polymers can also easily be prepared by the tertiary amine method, which is described in Example 19. This method is particularly valuable for preparing polymers from halogenated bisphenols. Example 20 describes the preparation of polycarbonates from bisphenols and diol bischloroformates. Examples 21 describes a preparation of block copolycarbonates from two bisphenols and phosgene. Example 22 describes the preparation of block copolycarbonates from bisphenols, phosgene, and polymeric diol bischloroformates.

Example 18

General procedure for preparing polycarbonates form bisphenols and phosgene (interfacial method).—In a well-ventilated hood a 500 ml., three-necked flask is fitted with a stirrer, thermometer, and glass inlet tube which extends beneath the surface of the reaction mixture. A flowmeter containing a glass ball float (to indicate the rate of phosgene addition) and a trap are placed between the inlet tube and the lecture bottle of phosgene. Also attached to the system to relieve any excess pressure is a tube leading under about one inch of mercury in a side-arm test tube. The phosgene lecture bottle, attached to the system through a piece of neoprene tubing, is continuously weighed on a balance to follow the addition. To determine the exact amount of phosgene added, the lecture bottle, disconnected from the system, is weighed before and after the addition. Glass tubing is used as much as possible since rubber tubing deteriorates in the presence of phosgene. During the addition of phosgene the reaction mixture is cooled with a cold-water bath to keep the temperature below 25° C. (usually 15–20° C.). The bath is then removed while the polymer is building up.

To the flask are added 12 g. of sodium hydroxide dissolved in 200 ml. of water, 0.10 mole of the bisphenol, 150 ml. of methylene chloride, and 4 drops (0.06 g.) of tributylamine. [Benzyltriethylammonium chloride catalyst (1.0 g./0.1 mole of bisphenol) was used in preparing some of the polymers, but tributylamine is more effective and gives a faster polymerization.] If the mixture becomes too thick and mushy due to the formation of an insoluble bisphenol sodium salt, more water is added. While this mixture is stirred and cooled in a cold-water bath which holds the reaction temperature at about 20° C., phosgene is passed in from the lecture bottle at a rate of about 1 g./min. until the loss in weight of the bottle is 10.5–11.0 g. If some of the bisphenol or its salt has not gone into solution by this time, more phosgene and aqueous sodium hydroxide (to keep the pH above 12) are added. Also, more phosgene is added if the aqueous layer becomes turbid on acidification of a portion. Usually during the next 10–60 min. the methylene chloride layer becomes very viscous. The mixture is then neutralized with acetic or hydrochloric acid and diluted with more methylene chloride. By this procedure a polycarbonate with an inherent viscosity (in chloroform) of approximately 1.0 is obtained. An appreciably higher inherent viscosity can be obtained by diluting the mixture with more methylene chloride and allowing the polymerization to proceed longer before neutralization. Lower inherent viscosities are obtained by neutralizing the mixture sooner.

After the neutralized reaction mixture is stirred for 1 hr., deionized water is passed in through a tube extending to the bottom of the flask while stirring is continued. The water is allowed to overflow into the sink during this washing period of several hours.

All of the polycarbonates can be precipitated, usually as white, fibrous products, by adding the methylene chloride layer to several volumes of hexane or heptane with stirring. Many of the polymers can also be precipitated in methanol, ethyl alcohol, isopropyl alcohol, or acetone in this manner. It is preferable that the methylene chloride layer not be thick to prevent the polymer from separating first as a gummy material. The most convenient method of precipitation, which is not effective with all of the polymers, is to add acetone slowly to the methylene chloride layer with stirring. The polycarbonate precipitates as small particles. After the mixture is stirred for 15 to 30 min., about two-thirds of the solvent is decanted, and an equal volume of hexane or heptane is added with stirring to cause the polymer particles to harden slightly. (The particles of some polymers coagulate into an elastic mass when the hydrocarbon is not added.) This mixture is stirred for 30 min., and then the solvent is then completely decanted. Hexane or heptane is added and the mixture stirred for 30 min. to complete the hardening of the particles. The polymer is then collected and dried.

Example 19

General procedure for preparing polycarbonates from bisphenols and phosgene (tertiary amine method).—A 500-ml., three-necked flask is set up in the apparatus described in Example 18. To the flask are added 300 ml. of methylene chloride, 50 ml. of dry pyridine and 0.10 mole of the unhydrated bisphenol. While the mixture is stirred and the temperature is held at 25–30° C. by means of the cold-water bath, phosgene is passed in at a rate of about 1 g./min. After about one-half of the theoretical amount of phosgene has been added, pyridine hydrochloride precipitates. When 9.6–9.8 g. of phosgene has been added, the addition rate is decreased to about 0.1 g./min. The addition is stopped when the mixture becomes very viscous. About 10.5 g. of phosgene is required: The mixture is then poured into a large volume of water. More methylene chloride is added to dilute the organic layer, and hydrochloric acid is added until the pH of the stirred mixture is 1.5. The methylene chloride layer is washed with water and the polymer precipitated as described under the interfacial method. The inherent viscosity of the polymer is about 1.2–1.6 (depending upon the weight of bisphenol used initially).

Example 20

General procedure for preparing polycarbonates from bisphenols and diol bischloroformates.—This procedure describes the preparation of these polymers by the interfacial method. The polymers can also be prepared by adding the biscoloroformate to an equimolar amount of the bisphenol dissolved in a teriary amine methylene chloride mixture.

A 500 ml., three-necked flask is set up in the apparatus described in Example 18. To the flask are added 0.20 mole of sodium hydroxide dissolved in 200 ml. of water, 0.10 mole of the bisphenol, 150 ml. of methylene chloride, and 4 drops (0.06 g.) of tributylamine. While this mixture is stirred and cooled in a water bath which holds the reaction temperature at about 20° C., 0.095 mole of the diol bischloroformate dissolved in 100 ml. of ethylene dichloride is added. Usually during the next 10–60 min. the methylene chloride layer becomes very viscous. The mixture is then neutralized with acetic or hydrochloric acid and treated as in Example 18 to wash and isolate the polymer. Higher polymer molecular weights are obtained by diluting the viscous methylene chloride layer with more methylene chloride and allowing polymerization to proceed further.

Example 21

Procedure for preparing block copolycarbonates from two bisphenols and phosgene.—Block copolycarbonates can be prepared by manufacturing in separate reaction vessels low molecular polycarbonates having molecular weights corresponding to inherent viscosities measures in chloroform of from about 0.05 to about 0.4. Such molecular weights as a rough estimate will be less than about 10,000. The preparation of the low molecular weight polycarbonates is substantially the same as that described hereinabove for the preparation of the high molecular weight polycarbonates except that the polymerization is not allowed to proceed beyond a point where the inherent viscosity surpasses about 0.4. This can be readily determined by those skilled in the art using normal techniques for approximating the I.V. values. It is advantageous to prepare the two separate blocks in the form of their low molecular weight polycarbonates at the same time so that when they have reached the desired molecular weights the two reaction mixtures can be mixed together, additional phosgene added and the reaction continued until the desired inherent viscosity is achieved for the final polycarbonate having the molecular weight being sought. A typical procedure follows:

Three grams of phosgene was added to a mixture containing 4 grams of sodium hydroxide, 50 ml. of water, 8 grams of bisphenol A (0.035) mole), 2 drops of tributylamine, and 30 ml. of methylenechloride. The mixture was stirred for two minutes. This product was a low molecular weight polycarbonate suitable for the formation of a block copolycarbonate.

In a separate reaction vessel simultaneously with the preceding preparation, there was added 1.7 grams of phosgene to a mixture of 2.0 grams of sodium hydroxide, 60 ml. of water, 6.3 grams of 4,4'-(2-norbornylidene)bis [2,6-dichlorophenol], 1 drop of tributylamine, and 20 ml. of methylene chloride which was then stirred for 10 minutes. This low molecular weight polycarbonate had an inherent viscosity within the specified range and was suitable for the preparation of a block copolycarbonate.

The two low molecular weight polycarbonates described in the preceding two paragraphs were mixed together immediately following the time periods of reaction previously indicated, 1.0 gram of phosgene was added and the mixture was stirred continuously until the methylene chloride layer was very thick. It was then diluted with more methylene chloride; neutralized with acetic acid, and washed with water. The resulting block copolycarbonate was precipitated in ethanol or some other suitable nonsolvent.

Example 22

Procedure for preparing block copolycarbonates from bisphenols, phosgene, and polymeric diol bischloroformates—This procedure consists simply of a modification of Example 18. After the addition of 8.0 g. of phosgene to the bisphenol reaction mixture described in Example 18, the polymeric diol bischloroformate is added, followed by sufficient phosgene to buildup the polymer to a high molecular weight. The polymer is then washed and isolated as in Example 18.

PROPERTIES OF POLYCARBONATE FILMS

Some of the properties obtained on films of the polycyclic bisphenol polycarbonates are listed in Table 1. All films were cast from methylene chloride by conventional techniques. The films, 1–3 mils thick, were air-dried and then heated in an oven at 110° C. for 1–2 hours to ensure the removal of all solvent. All films were tough, and they were completely transparent and colorless.

The inherent viscosities (I.V.) of the polymers were measured in chloroform. The heat-distortion temperatures of the films (2 percent deflection with 50-p.s.i. load) were measured in a forced convection oven (ASTM D1637–61). The second-order transition temperature was taken as the temperature at which the film distorted (shrank) ¼ percent at a load of 5 p.s.i. when heated in the above oven. Tensile properties were measured in accordance with ASTM D882–61T Method A.

The tensile modulus values of the films are given in the table, but the tensile strength values (yield and break) are not listed because they all fall in a comparatively narrow range (9,000–16,000 p.s.i. and usually 10,000–12,000 p.s.i.) the elongations also are not listed because they depend upon the film casting conditions. The elongations were usually 3–30 percent, but films have been cast with elongations up to 100 percent. The highest elongations were obtained on films with inherent viscosities of 2.0 and higher, the lowest elongations (3–8 percent) were obtained on films from the halogenated bisphenol polymers. The elongations and tensile strengths were increased by stretching the films at temperatures somewhat below their second-order transition temperatures.

Contrary to what might be expected of soluble, noncrystalline polymers containing bulky side groups attached to the main polymer chain, these polymers softened at very high temperatures—above 300° C. in most cases. Since many of the polymers softened at such high temperatures that they decomposed, the values had little melting. The second-order transition and heat-distortion temperatures are more accurate measures of the high-temperature usefulness of the polymers. Softening temperatures are listed in Table 1 when second-order transition or heat-distortion temperatures were not determined.

The diol bischloroformates listed in Table 1 are abbreviated as follows:

1,4-cyclohexanedimethanol bischloroformate—CH Clf
2,2-dimethyl-1,3-propanediol bischloroformate—DM Clf
Ethylene glycol bischloroformate—EG Clf
2,5-norbornanediol bischloroformate—ND Clf
10 wt. percent polyethyleneoxide (m.w. 1500) bischoloformate—PE Clf (10)
27 wt. percent polypropyleneoxide (m.wt. 200) bischloroformate—PP Clf (27)

tric constant over a wide frequency and temperature range (ASTM D149–61 and D150–59T).

Films of all homopolycarbonates prepared from bisphenols containing 4 halogen atoms were nonburning according to ASTM D568–61.

The films had excellent thermal and oxidative stability: they remained tough while being heated in air at 200° C. for 4 days.

Compared to most other polymers, with increasing temperature there is only a relatively slow decrease of tensile strength and tensile modulus of these polycyclic bisphenol polycarbonates. This is illustrated for a few of the polymers in Table 2. Even at 200° C. the tensile

| Bisphenol | Halide | I.V. | 2d Order Trans. Temp., °C. | Heat Distortion Temp., °C. | Modulus, $10^5$ p.s.i. | Softening Temp., °C. |
|---|---|---|---|---|---|---|
| 4,4′-(2-norbornylidene)diphenol | $COCl_2$ | 2.2 | 224 | 233 | 3.7 | 300+ |
| Do | ND Clf | 3.0 | 230 | 234 | 3.4 | 255 |
| Do | DM Clf | 0.8 | | | | 220 |
| Do | EG Clf | 0.8 | | | | 240 |
| 4,4′-(2-norbornylidene)di-o-cresol | $COCl_2$ | 0.9 | 161 | 133 | 3.8 | 250 |
| 4,4′-(2-norbornylidene)bis(2,6-dimethylphenol) | $COCl_2$ | 0.5 | | | | 300 |
| 4,4′-(2-norbornylidene)bis-[2-chlorophenol] | $COCl_2$ | 1.4 | 200 | 239 | 4.9 | |
| 4,4′-(2-norbornylidene)bis-[2,6-dichlorophenol] | $COCl_2$ | 0.9 | 290 | 300 | 5.0 | |
| 4,4′-(2-norbornylidene)bis-[2,6-dichlorophenol] and bisphenol A prepolymers (Example 21). | $COCl_2$ | 0.8 | | 200 | 3.7 | |
| Copolymer from equimolar amounts of preceding 2 bisphenols | $COCl_2$ | 0.7 | | 230 | 3.8 | |
| 4,4′-(2-norbornylidene)bis-[2,6-dibromophenol] | $COCl_2$ | 0.4 | 283 | 306 | 4.5 | |
| 4,4′-(5,6-dimethyl-2-norbornylidene)diphenol | $COCl_2$ | 1.2 | | | | 300+ |
| 4,4′-(5,6-diphenyl-2-norbornylidene)diphenol | $COCl_2$ | 0.8 | | | | 300+ |
| 4,4′-(2-norbornylmethylene)diphenol | $COCl_2$ | 1.1 | 207 | 225 | 3.5 | 290 |
| Do | ND Clf | 1.7 | | | | 245 |
| Do | DM Clf | 1.0 | | | | 215 |
| Do | $COCl_2$, PE Clf(10) | 0.7 | | | | 285 |
| 4,4′-(2-norbornylmethylene)bis-[2,6-dicholorphenol] | $COCl_2$ | 0.8 | 270 | 285 | 4.5 | |
| 4,4′-(2-norbornymethylene)bis[2,6-dibromophenol] | $COCl_2$ | 0.5 | 278 | 290 | 4.7 | |
| 4,4′-(3-methyl-2-norbornylmethylene)diphenol | $COCl_2$ | 1.1 | 220 | 239 | 3.3 | |
| 4,4′-(3-methyl-2-norbornylmethylene)-bis[2,6-dichlorophenol] | $COCl_2$ | 0.7 | 270 | 280 | 5.0 | |
| 4,4′-(3-phenyl-2-norbornylmethylene)diphenol | $COCl_2$ | 1.5 | 196 | 228 | 3.2 | |
| 4,4′-(5,6-dimethyl-2-norbornylmethylene)diphenol | $COCl_2$ | 1.0 | 215 | 226 | 3.6 | |
| 4,4′-(5 or 6-phenyl-2-norbornylmethylene)diphenol | $COCl_2$ | 0.7 | 226 | 237 | 3.7 | |
| 4,4′-(hexahydro-4,7-methanoindan-5-ylidene)diphenol | $COCl_2$ | 2.0 | 256 | 266 | 3.7 | |
| Do | EG Clf | 0.6 | | | | 260 |
| Do | DM Clf | 0.5 | | | | 180 |
| Do | PE Clf(20), $COCl_2$ | 1.1 | | | | 240 |
| Do | $COCl_2$, PP Clf(27) | 0.8 | | | | 220 |
| 4,4′-(hexahydro-4,7-methanoindan-5-ylidene)di-o-cresol | $COCl_2$ | 1.3 | 217 | 201 | 4.2 | |
| 4,4′-(hexahydro-4,7-methanoindan-5-ylidene)bis[2,6-dichlorophenol] | $COCl_2$ | 1.5 | 281 | 304 | 4.5 | |
| 4,4′-(hexahydro-4,7-methanoindan-5-ylidene)bis[2,6-dibromophenol]. | $COCl_2$ | 0.4 | 295 | 310 | 4.9 | |
| 4,4′-(dodecahydro-4,9,5,8-dimethano-1-cyclopenta(b)naphthalen-6-ylidene)-diphenol. | $COCl_2$ | 1.0 | | 280 | 4.0 | |
| Do | DM Clf | 1.2 | | | | 250 |
| Do | ND Clf | 1.2 | | | | 300 |
| 4,4′-(decahydro-1,4-exo-5,8-endodimethanonaphth-2-ylidene)-diphenol. | $COCl_2$ | 1.8 | 273 | 272 | 3.9 | |
| Do | EG Clf | 1.0 | | | | 270 |
| 4,4′(decahydro-1,4-exo-5,8-endodimethanonaphth-2-ylidene)di-o-cresol. | $COCl_2$ | 0.8 | 232 | 239 | 4.6 | |
| 4,4′-(decahydro-1,4-exo-5,8-endodimethanonaphth-2-ylidene)bis[2,6-dichlorophenol]. | $COCl_2$ | 0.6 | | 315 | 5.1 | |
| 4,4′-(decahydro-1,4-exo-5,8-exodimethanonaphth-2-ylidene)-diphenol. | $COCl_2$ | 1.6 | 262 | 283 | 3.1 | |
| Do | ND Clf | 1.3 | | 256 | 3.5 | |
| 4,4′-(decahydro-1,4:5,8-dimethanonaphth-2-ylmethylene)diphenol | $COCl_2$ | 1.6 | 253 | | 3.3 | |
| 4,4′-(decahydro-1,4:5,8-dimethanonaphth-2-ylmethylene)bis[2,6-dichlorophenol]. | $COCl_2$ | 0.7 | | 298 | 4.8 | |
| 4,4′-(hexahydro-4,7-methanoindan-5-ylmethylene)diphenol | $COCl_2$ | 0.8 | | 255 | 3.8 | |
| 4,4′-(hexahydro-4,7-methanoindan-5-ylmethylene)bis[2,6-dichlorophenol]. | $COCl_2$ | 0.8 | | 293 | 4.7 | |
| 4,4′-(hexahydro-4,7-methanoindan-2 or 3-ylmethylene)diphenol | $COCl_2$ | 0.9 | 209 | 218 | 3.0 | |
| Do | ND Clf | 1.2 | | | | 270 |
| Do | EG Clf | 0.6 | | | | 235 |
| Do | $COCl_2$, PE Clf(10) | 1.2 | | | | 270 |
| 4,4′-(hexahydro-4,7-methanoindan-2 or 3-ylmethylene)bis[2,6-dichlorophenol]. | $COCl_2$ | 0.9 | 265 | 282 | 4.5 | |
| 4,4′-(hexahydro-4,7-methanoindan-1-ylidene)diphenol | $COCl_2$ | 1.3 | | 230 | 4.0 | |
| Do | EG Clf | 1.0 | | | | 260 |
| 4,4′-(octahydro-4,7-methanoisobenzofuran-6-ylidene)diphenol | $COCl_2$ | 0.9 | | 255 | 3.9 | |
| 4,4′-(octahydro-4,7-methanoisobenzofuran-6-ylidene)bis[2,6-dichlorophenol]. | $COCl_2$ | 0.7 | | 306 | 4.8 | |
| 4,4′-(bicyclo[3.2.1]oct-2-ylidene)-diphenol | $COCl_2$ | 0.8 | | 260 | 3.9 | |
| 4,4′-(bicyclo[3.2.1]oct-2-ylidene)-bis[2,6-dichlorophenol] | $COCl_2$ | 0.7 | | 300 | 5.0 | |
| 4,4′-(bicyclo[3.2.2]non-2-ylidene)-diphenol | $COCl_2$ | 0.9 | | 265 | 4.0 | |
| 4,4′-(bicyclo[3.2.2]non-2-ylidene)-bis[2,6-dichlorophenol] | $COCl_2$ | 0.9 | | 300 | 5.0 | |
| 4,4′-(bicyclo[2.2.2]oct-2-ylmethylene)diphenol | $COCl_2$ | 1.0 | | 230 | 3.6 | |
| 4,4′-(bicyclo[2.2.2]oct-2-ylmethylene)bis[2,6-dichlorophenol] | $COCl_2$ | 0.9 | | 290 | 4.9 | |
| 4,4′-(3-methylbicyclo[2.2.2]oct-2-ylmethylene)diphenol | $COCl_2$ | 0.7 | | 235 | 3.5 | |
| 4,4′-(spiro[cyclopropane-1,7′-norborn-2′-yl]methylene)diphenol | $COCl_2$ | 0.8 | | 230 | 3.8 | |
| 4,4′-(tricyclo[2.2.1.0²·⁶]heptan-3-ylidene)diphenol | $COCl_2$ | 1.1 | | 241 | 4.0 | |
| Do | ND Clf | 1.9 | | 235 | 3.8 | |
| Do | EG Clf | 0.8 | | | | 260 |

The polycarbonate films had excellent electrical properties: high dielectric strength, high volume resistivity, low dissipation factor, constant dissipation factor and dielec-strengths and moduli are appreciable. At the bottom of the table are the corresponding properties of two commercial polymers.

TABLE 2.—HIGH-TEMPERATURE TENSILE PROPERTIES OF POLYCARBONATE FILMS

| Polycarbonate From— | Yield Strength, p.s.i. | | | Break Strength | | | Modulus 10⁵ p.s.i. | | |
|---|---|---|---|---|---|---|---|---|---|
| | 100° C. | 150° C. | 200° C. | 100° C. | 150° C. | 200° C. | 100° C. | 150° C. | 200° C. |
| 4,4'-(2-norbornylidene)diphenol | | | 4,500 | | | 5,600 | | | 2.3 |
| 4,4'-(2-norbornylidene)bis[2,6-dichlorophenol] | 9,300 | 5,500 | 4,400 | Not measured | | 3.0 | 2.2 | 1.9 |
| 4,4'-(2-norbornylmethylene)-diphenol | | | 3,900 | | 4,000 | | 3,500 | 2.3 | 2.2 |
| 4,4'-(2-norbornylmethylene)bis-[2,6-dichlorophenol] | | | 4,800 | | | | 4,900 | | 2.5 |
| 4,4'-(3-methyl-2-norbornylmethylene)diphenol | 6,500 | 4,900 | 3,600 | 6,800 | 5,700 | 3,800 | 2.4 | 2.3 | 1.8 |
| 4,4'-(hexahydro-4,7-methanoindan-5-ylidene)diphenol | 8,500 | 5,200 | 3,800 | 7,500 | 4,500 | 2,700 | 2.7 | 2.4 | 2.0 |
| 4,4'-isopropylidenediphenol | 5,500 | 2,300 | 0 | Not measured | | | 2.4 | 0.3 | 0.0 |
| Poly(ethyleneterephthalate) polyester | 5,100 | 1,900 | 750 | Not measured | | | 2.6 | 0.7 | 0.3 |

PROPERTIES OF POLYCARBONATE MOLDING PLASTICS

Some of the properties which were determined on injection-molded specimens of a few of the polycyclic bisphenol polycarbonates and copolycarbonates are given in Table 3. At the bottom of the table, for comparative purposes, are given the properties which were obtained on two commercial plastics.

The heat-distortion temperatures (2 percent deflection with 66 p.s.i. load) were measured in a forced-convection oven as described in Modern Plastic, 34 (No. 3), 169 (1956). Izod impact strength and tensile properties were measured in accordance with ASTM D–256–56 Method A and ASTM D1708–59T, respectively.

phenol, 4,4'-dihydroxydiphenyl, 4,4'-methylenediphenol, hydroquinone, resorcinol, 1,4-naphthalenediol, 2,5-naphthalenediol, and other bisphenols listed in U.S. Pat. 3,030,335.

The ester interchange between a bisphenol and the phenyl or cresyl ester of the dicarboxylic acid is catalyzed by the oxide, hydroxide, or hydride of an alkali metal or alkaline earth metal or by the free alkali or alkaline earth metal itself. Other suitable catalysts include zinc oxide, lead oxide, dibutyltin oxide, sodium aluminate, butyl lithium, and phenyl lithium.

The usual method is followed of heating the reactants under vacuum to remove phenol or cresol as the condensation proceeds. It is preferred to build up final molecular

TABLE 3.—PROPERTIES OF INJECTION-MOLDED POLYCARBONATES

| Polycarbonate From— | Amt. of Bisphenol A ᵃ, Mole percent | Heat-Distortion Temp., °C. | Izod Impact Strength, Ft.-lb./In. of Notch | Tensile Strength, p.s.i. | | Elong. at Break, percent |
|---|---|---|---|---|---|---|
| | | | | At Yield | At Break | |
| 4,4'-(2-norbornylidene)diphenol | | 233 | 0.8 | 11,600 | 10,300 | 54 |
| 4,4'-(2-norbornylidene)bis[2,6-dichlorophenol] | 70 | 199 | 0.8 | 10,800 | 9,500 | 29 |
| 4,4'-(2-norbornylidene)bis[2,6-dibromophenol] | 86 | 179 | | 10,500 | 9,300 | 48 |
| 4,4'-(2-norbornylmethylene)diphenol | | 219 | 1.3 | | 11,800 | 40 |
| 4,4'-(3-methyl-2-norbornylmethylene)diphenol | | 226 | 1.3 | 10,800 | 10,200 | 30 |
| 4,4'-(hexahydro-4,7-methanoindan-5-ylidene)diphenol | 50 | 204 | 1.2 | 11,200 | 9,900 | 30 |
| 4,4'-isopropylidenediphenol | 100 | 153 | 16 | 8,800 | 11,400 | 95 |
| Nylon 66 polyamide | | 180 | 0.9 | 12,000 | 11,000 | 60 |

ᵃ 4,4'-isopropylidenediphenol, added to give a copolymer.

Rockwell hardness values were very high, about R124. The electrical properties were the same as those of the films (high dielectric strength, high volume resistivity, low dissipation factor, and constant dissipation factor and dielectric constant over a wide frequency and temperature range). In addition, the two copolymers from halogenated bisphenols were nonburning according to ASTM D635–56T. The other polycarbonates in Table 3 were self-extinguishing according to this test.

BISPHENOL POLYESTERS

The dicarboxylic acid polyesters of this invention are prepared by condensing the novel polycyclic bisphenols with dicarboxylic acids by ester interchange reactions between the novel bisphenols and esters of aliphatic, cycloaliphatic, and aromatic dicarboxylic acids. Phenyl or cresyl esters of the dicarboxylic acids are convenient to use. Suitable aliphatic dicarboxylic acids include oxalic, dimethylmalonic, succinic, glutaric, adipic, pimelic, azelaic, sebacic, and 2-methyladipic. Suitable cycloaliphatic acids include cyclohexane-1,4-dicarboxylic acid, cyclohexane-1,3-dicarboxylic acid, cyclopentane-1,3-dicarboxylic acid, and 2,5-norbornane-dicarboxylic acid. Either cis- or trans-forms of the acids may be used. Suitable aromatic dicarboxylic acids include terephthalic, isophthalic, t-butylisophthalic, diphenic, 4,4'-sulfonyldibenzoic, 4,4'-oxydibenzoic, and 2,5-naphthalene-dicarboxylic. Other suitable acids are those found in column 7 of U.S. Pat. 2,720,506. Mixtures containing two or more acids, two or more bisphenols or an aliphatic or cycloaliphatic glycol with the bisphenol may be used to give copolyesters.

Bisphenols which may be added with the polycyclic bisphenols to give copolyesters include 4,4'-isopropylidenediphenol (commonly known as bisphenol A), 4,4'-isopropylidenebis[2,6 - dichlorophenol], 4,4' - isopropylidenebis[2,6-dibromophenol], cyclohexylidenediphenol, cyclohexylmethylenediphenol, 4,4'-sulfonyldiphenol, 4,4'-oxydiweight by the solid-phase process in which the granulated polymer is heated in a vacuum at a temperature somewhat below the melting point. It is difficult with the polyesters of this invention to build up molecular weight by melt polymerization due to the very high melt viscosities inherent in the polymers.

Polycarboxylates may also be prepared from the dicarboxylic acid chlorides by heating a mixture of equivalent amounts of bisphenol and acid chloride at temperatures from 160–280° C. or higher, or they may be reacted in a basic solvent such as pyridine or in a 2-phase system consisting of aqueous alkali and organic solvent phases as described in J. Poly. Sc., 40, 399 (1959).

Another process involves the ester interchange reaction of a monobasic aliphatic acid ester of the bisphenol with a dicarboxylic acid. The ester is heated with the acid to promote ester interchange with elimination of the monobasic acid. The final stage of the polymerization is carried out under vacuum. A catalyst such as manganese will speed the reaction.

EXAMPLE 23

*General procedure for preparing polyesters from bisphenols and diphenyl diesters.*—Nitrogen is added to displace the air from a flask containing 0.030 mole of the bisphenol, 0.030 mole of the dicarboxylic acid diphenyl ester, 0.001 g. of calcium hydride, and either 0.0005 g. of lithium hydride or 0.01 g. of sodium aluminate. (If the bisphenol is chlorinated, it is preferable to add 0.01 g. of dibutyltin oxide for the catalyst.) The mixture is melted down with stirring at 200° C. A vacuum of 30 mm. is applied, and phenol is distilled from the reaction mixture while it is heated to 280° C. The pressure is then reduced to about 0.5 mm., and heating is continued at 280–300° C. Usually during the next 10–60 minutes the polymer attains a high melt viscosity. It is cooled under vacuum, treated with acetone to aid in hardening, and ground to pass a 20-mesh screen. The molecular weight of the polymer is further increased by heating at about 0.1 mm. while the temperature is raised during 1 hr. from 180° C. to a value somewhat below the polymer melting point. Temperatures of 315–350° C. are normally satisfactory. This final temperature is then held for another hour.

Some of the copolymers, such as those prepared from an appreciable amount of diphenyl azelate or diphenyl sebacate, melt below 300° C. These polymers are built up to their final molecular weights in the melt.

PROPERTIES OF BISPHENOL POLYESTERS

Some of the properties obtained on films of the polycyclic bisphenol polyesters are listed in Table 4. Most of the films were cast from methylene chloride by conventional techniques, but a few were cast from chloroform or tetrachloroethane. The films were air-dried and then heated in an oven at 110° C. for 1–2 hr. to ensure the removal of all solvent. All films were tough and transparent.

The inherent viscosities (I.V.) of the polymers were measured in 60/40 phenol/tetrachloroethane. The heat-distortion temperatures of the films (2 percent deflection with 50 p.s.i. load) were measured in a forced convection oven (ASTM D1637–61). Tensile strengths, not listed, were 9000–15,000 p.s.i. Elongations, also not listed because they depend upon the film casting conditions, were, for the most part, 5–30 percent.

Like the polycarbonates, the bisphenol polyesters had very high softening points—above 300° C. in almost all examples—but more accurate measures of the high-temperature usefulness of polymers are their second-order transition and heat-distortion temperatures. The second-order transition temperatures of the polyesters were determined on only a few of the polymers, but the heat-distortion temperatures, listed in Table 4, were obtained on all of the polymers.

The diphenyl esters listed in Table 4 are abbreviated as follows:

Diphenyl trans-1,4-cyclohexanedicarboxylate—C
Diphenyl isophthalate—I
Diphenyl dimethylmalonate—M
Diphenyl sebacate—S
Diphenyl terephthalate—T All percentages in the table refer to mole percent.

TABLE 4.—PROPERTIES OF POLYESTERS FROM POLYCYCLIC BISPHENOLS

| Bisphenol | Diphenyl Ester | I.V. | Heat-Dist. Temp.,° C. |
|---|---|---|---|
| 4,4'-(2-norbornylidene)diphenol | I | 0.7 | 265 |
| Do | T | 1.1 | 280 |
| Do | C | 0.7 | 260 |
| Do | 75% T, 25% I | 0.6 | 272 |
| 60% 4,4'-(2-norbornylidene)-diphenol and 40% Bisphenol A. | T | 1.0 | 230 |
| 4,4'-(2-norbornylidene)bis[2,6-dichlorophenol]. | T | 0.7 | 305 |
| 4,4'-(2-norbornylmethylene)diphenol. | I | 0.8 | 260 |
| Do | C | 0.9 | 285 |
| Do | 70% T, 30% S | 0.6 | 215 |
| 4,4'-(2-norbornylmethylene)bis-[2,6-dichlorophenol]. | I | 0.5 | 298 |
| 4,4'-(3-methyl-2-norbornylmethylene)diphenol. | I | 0.9 | 270 |
| Do | T | 1.0 | 279 |
| Do | C | 0.6 | 285 |
| 4,4'-(5,6-dimethyl-2-norbornylmethylene)diphenol. | M | 0.7 | 200 |
| 4,4'-(hexahydro-4,7-methanoindan-methylene)diphenol. | I | 0.7 | 275 |
| Do | T | 0.6 | 285 |
| Do | C | 0.9 | 278 |
| Do | 75% T, 25% S | 0.7 | 230 |
| 4,4'-(decahydro-1,4-exo-5,8-endo-dimethanonaphth-2-ylidene)diphenol. | T | 0.8 | 285 |
| 4,4'-(decahydro-1,4:5,8-dimethano-naphth-2-ylmethylene)diphenol. | I | 0.7 | 277 |
| 4,4'-(hexahydro-4,7-methanoindan-5-ylmethylene)-diphenol. | T | 1.0 | 265 |
| 4,4'-(hexahydro-4,7-methanoindan-2 or 3-ylmethylene)-diphenol. | I | 0.7 | 250 |
| Do | T | 0.8 | 261 |
| 4,4'-(octahydro-4,7-methanoisobenzofuran-6-ylidene)-diphenol. | I | 0.5 | 271 |
| 4,4'-(bicyclo[3.2.1]oct-2-ylidene)-diphenol. | I | 0.5 | 270 |
| 4,4'-(bicyclo[3.2.2]non-2-ylidene)-diphenol. | I | 0.7 | 276 |
| 4,4'-(bicyclo[2.2.2]oct-2-ylmethylene)diphenol. | I | 0.6 | 269 |
| Do | T | 0.5 | 283 |
| 4,4'-(tricyclo[2.2.1.0² ⁶]-heptan-3-ylidene)diphenol. | I | 0.9 | 271 |
| Do | T | 0.8 | 283 |
| Do | C | 0.8 | 269 |

Other properties of the bisphenol polyesters, in general are similar to those of the polycarbonates: excellent electrical properties, excellent thermal and oxidative stability at elevated temperatures, and relatively slow decrease of tensile strength and tensile modulus with increasing temperature.

The copolyesters are particularly valuable as molding plastics. Some of the copolymers exhibit unusually high impact strengths. By using long-chain aliphatic dicarboxylic acids it was possible to increase the impact strengths and lower the heat distortion temperatures to produce polymers suitable for injection molding.

POLYCARBONATES AND POLYESTERS

From the foregoing description it is obvious that the polycyclic bisphenol polycarbonates and polyesters of this invention possess a very remarkable combination of properties. These polymers have exceedingly high second-order transition and heat-distortion temperatures—in most cases appreciably higher than any reported for polycarbonates and polyesters which are soluble in volatile solvents. Since the polymers are soluble in volatile solvents such as methylene chloride and chloroform, it is not necessary to process the polymers at high melt temperatures. Films can be readily obtained by casting from solvents, and fibers can be easily obtained by wet-spinning and dry-spinning from solution. The polymers and copolymers with second-order transition temperatures below 250° C. can be injection molded, but it is very difficult to satisfactorily injection-mold those with higher transition temperatures.

In the polycarbonate and polyester structures, R and R' extend from the main molecular chain and have an important

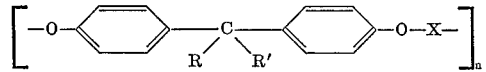

influence on molecular alignment and intermolecular attraction. When such side groups protrude from the main molecular chain in polyamides and polyesters, the melting points and second-order transition temperatures are lowered. Generally, the larger the side group the greater is the depression of these properties. Schnell, Ind. Eng. Chem., 51, 157 (1959) has pointed out that asymmetrical substitution lowers the melting range of polycarbonates. Our polycarbonates and polyesters from polycyclic bisphenols, on the other hand, show the opposite effect: the second-order transition temperature is increased when the size of the polycyclic side group is increased.

It is believed that the high second-order transition temperatures of these polycyclic bisphenol polymers can be attributed to two factors: (1) the molecular chains are comparatively stiff and rigid and (2) the pendant polycyclic groups are three-dimensional in shape. Factor (1): As can be demonstrated with models, the two phenyl groups are attached to a carbon atom which has a high degree of steric hindrance. These phenyl groups, therefore, are rigidly attached, much more so than the phenyl groups in the bisphenol A polymers, which have high second-order transition temperatures that are attributed to stiffness of the molecular chain. Factor (2): The polycyclic groups are three-dimensional structures, and each dimension is appreciable. The norbornane ring, for instance, has the following structure:

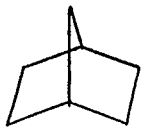

Therefore, a group cannot be oriented in a preferred direction to pass through a small space between molecular chains as can alkyl, phenyl, or cyclohexyl groups, all of which have at least one relatively small dimension. Since softening and melting in polymers is due to the movement of molecular chains, polymers containing three-dimensional polycyclic structures have the higher softening points and second-order transition temperatures.

Polymers from the halogenated bisphenols have appreciably higher second-order transition and heat-distortion temperatures than those from the unhalogenated bisphenols. It is probable that the halogen atoms are functioning both as chain-stiffening agents and bulky side groups, thus adding to the effect of the polycyclic structure.

In the above structure when R, R', and C are part of a cyclohexane ring and X is carbonyl, the polycarbonate has a second-order transition temperature of 179° C. as determined by our heat-distortion procedure. [Schnell, Ind. Eng. Chem., 51, 157 (1959) reports 175° C.] When R, R', and C are part of a norbornane ring, on the other hand, the polycarbonate has a second-order transition temperature of 224° C. When a five-membered ring is fused to the norbornane ring, the second-order transition temperature is higher—256° C. The transition temperature is even higher when a second norbornane ring is fused instead of a cyclopentane ring.

Similarly, when X is isophthaloyl or terephthaloyl, the corresponding bisphenol polyesters have exceptionally high second-order transition and heat-distortion temperatures compared to those in the literautre, such as in J. Poly. Sci., 40, 399 (1959).

Since the polycyclic bisphenol polycarbonates and polyesters of this invention have excellent oxidative and thermal stability, they are suitable for use in numerous applications requiring stability at elevated temperatures. Since the polymers have exceptional electrical properties, they are particularly valuable for use as electrical insulating materials and capacitor dielectrics when operation at elevated temperatures is essential.

Nonburning films, fibers, and plastics can be obtained from the halogenated polycyclic bisphenols. The plastics which contain no halogen are self-extinguishing without dripping.

Other applications of the invention include utility as photographic film base, magnetic tape base, adhesive tape base, sheet packaging materials, protective coatings, molded components for aircraft and space vehicles, nonburning protective clothing, etc.

Although the invention has been described in considerable detail with reference to certain preferred embodiments thereof, it will be understood that variations and modifications can be effected without departing from the spirit and scope of the invention as described hereinabove and as defined in the appended claims.

We claim:
1. A bisphenol having the general formula:

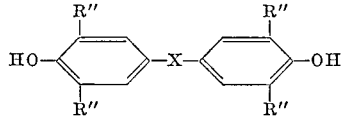

wherein R" is a member selected from the group consisting of hydrogen, halogen and alkyl groups containing from 1 to 4 carbon atoms and X is a gem-bivalent radical selected from the group consisting of radicals having the following general formulas:

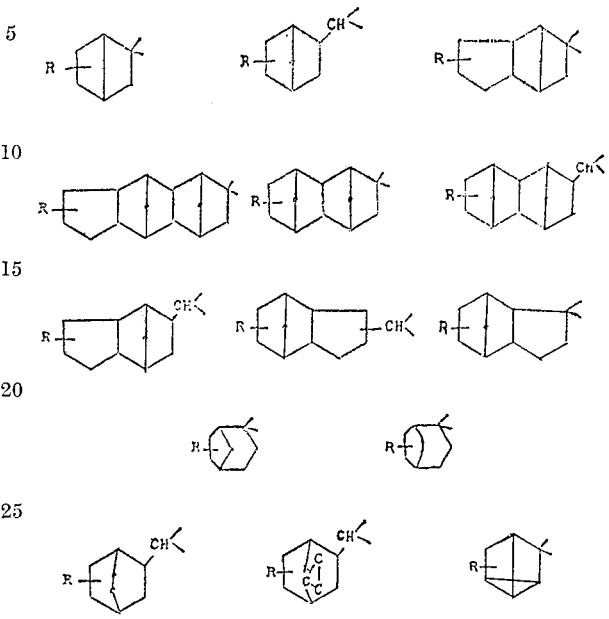

wherein R is selected from the group consisting of hydrogen atoms, halogen atoms, phenyl groups and alkyl groups containing from 1 to 4 carbon atoms.

2. A bisphenol having the general formula:

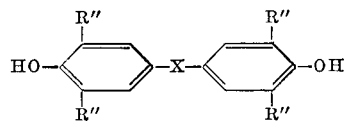

wherein R" is a member selected from the group consisting of hydrogen atoms, halogen atoms and alkyl groups containing from 1 to 4 carbon atoms and X is a gem-bivalent radical having the following general formula:

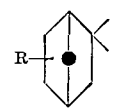

wherein R is selected from the group consisting of hydrogen atoms, halogen atoms, phenyl groups and alkyl groups containing from 1 to 4 carbon atoms.

3. A bisphenol having the general formula:

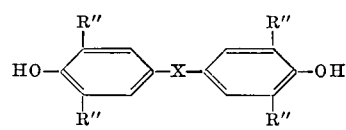

wherein R" is a member selected from the group consisting of hydrogen atoms, halogen atoms and alkyl groups containing from 1 to 4 carbon atoms and X is a gem-bivalent radical having the following general formula:

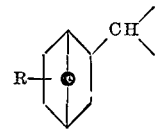

wherein R is selected from the group consisting of hydrogen atoms, halogen atoms, phenyl groups, and alkyl groups containing from 1 to 4 carbon atoms.

4. A bisphenol having the general formula:

HO—⟨R″⟩—X—⟨R″⟩—OH (with R″ substituents)

wherein R″ is a member selected from the group consisting of hydrogen atoms, halogen atoms and alkyl groups containing from 1 to 4 carbon atoms and X is a gem-bivalent radical having the following general formula:

[bicyclic structure with R substituent]

wherein R is selected from the group consisting of hydrogen atoms, halogen atoms, phenyl groups and alkyl groups containing from 1 to 4 carbon atoms.

5. A bisphenol having the general formula:

HO—⟨R″⟩—X—⟨R″⟩—OH wherein R″ is a member selected from the group consisting of hydrogen atoms, halogen atoms and alkyl groups containing from 1 to 4 carbon atoms and X is a gem-bivalent radical having the following general formula:

[tricyclic structure with R substituent]

wherein R is selected from the group consisting of hydrogen atoms, halogen atoms, phenyl groups and alkyl groups containing from 1 to 4 carbon atoms.

6. A bisphenol having the general formula:

HO—⟨R″⟩—X—⟨R″⟩—OH wherein R″ is a member selected from the group consisting of hydrogen atoms, halogen atoms and alkyl groups containing from 1 to 4 carbon atoms and X is a gem-bivalent radical having the following general formula:

[tricyclic structure with R substituent]

wherein R is selected from the group consisting of hydrogen atoms, halogen atoms, phenyl groups and alkyl groups containing from 1 to 4 carbon atoms.

7. A bisphenol having the general formula:

HO—⟨R″⟩—X—⟨R″⟩—OH wherein R″ is a member selected from the group consisting of hydrogen atoms, halogen atoms and alkyl groups containing from 1 to 4 carbon atoms and X is a gem-bivalent radical having the following general formula:

[tricyclic structure with R substituent and CH group]

wherein R is selected from the group consisting of hydrogen atoms, halogen atoms, phenyl groups and alkyl groups containing from 1 to 4 carbon atoms.

8. A bisphenol having the general formula:

HO—⟨R″⟩—X—⟨R″⟩—OH wherein R″ is a member selected from the group consisting of hydrogen atoms, halogen atoms and alkyl groups containing from 1 to 4 carbon atoms and X is a gem-bivalent radical having the following general formula:

[bicyclic structure with R substituent and CH group]

wherein R is selected from the group consisting of hydrogen atoms, halogen atoms, phenyl groups and alkyl groups containing from 1 to 4 carbon atoms.

9. A bisphenol having the general formula:

HO—⟨R″⟩—X—⟨R″⟩—OH wherein R″ is a member selected from the group consisting of hydrogen atoms, halogen atoms and alkyl groups containing from 1 to 4 carbon atoms and X is a gem-bivalent radical having the following general formula:

[bicyclic structure with R substituent and CH group]

wherein R is selected from the group consisting of hydrogen atoms, halogen atoms, phenyl groups and alkyl groups containing from 1 to 4 carbon atoms.

10. A bisphenol having the general formula:

HO—⟨R″⟩—X—⟨R″⟩—OH wherein R″ is a member selected from the group consisting of hydrogen atoms, halogen atoms and alkyl groups containing from 1 to 4 carbon atoms and X is a gem-bivalent radical having the following general formula:

[bicyclic structure with R substituent]

wherein R is selected from the group consisting of hydrogen atoms, halogen atoms, phenyl groups and alkyl groups containing from 1 to 4 carbon atoms.

11. A bisphenol having the general formula:

HO—⟨R″⟩—X—⟨R″⟩—OH wherein R″ is a member selected from the group consisting of hydrogen atoms, halogen atoms and alkyl groups containing from 1 to 4 carbon atoms and X is a gem-bivalent radical having the following general formula:

[bicyclic structure with R substituent]

wherein R is selected from the group consisting of hydrogen atoms, halogen atoms, phenyl groups and alkyl groups containing from 1 to 4 carbon atoms.

12. A bisphenol having the general formula:

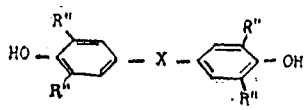

wherein R" is a member selected from the group consisting of hydrogen atoms, halogen atoms and alkyl groups containing from 1 to 4 carbon atoms and X is a gem-bivalent radical having the following general formula:

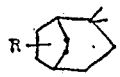

wherein R is selected from the group consisting of hydrogen atoms, halogen atoms, phenyl groups and alkyl groups containing from 1 to 4 carbon atoms.

13. A bisphenol having the general formula:

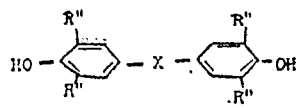

wherein R" is a member selected from the group consisting of hydrogen atoms, halogen atoms and alkyl groups containing from 1 to 4 carbon atoms and X is a gem-bivalent radical having the following general formula:

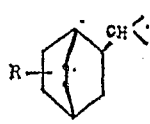

wherein R is selected from the group consisting of hydrogen atoms, halogen atoms, phenyl groups and alkyl groups containing from 1 to 4 carbon atoms.

14. A bisphenol having the general formula:

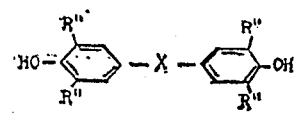

wherein R" is a member selected from the group consisting of hydrogen atoms, halogen atoms and alkyl groups containing from 1 to 4 carbon atoms and X is a gem-bivalent radical having the following general formula:

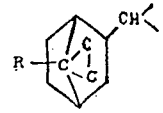

wherein R is selected from the group consisting of hydrogen atoms, halogen atoms, phenyl groups and alkyl groups containing from 1 to 4 carbon atoms.

15. A bisphenol having the general formula:

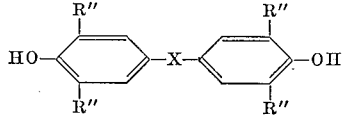

wherein R" is a member selected from the group consisting of hydrogen atoms, halogen atoms and alkyl groups containing from 1 to 4 carbon atoms and X is a gem-bivalent radical having the following general formula:

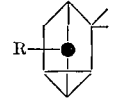

wherein R is selected from the group consisting of hydrogen atoms, halogen atoms, phenyl groups and alkyl groups containing from 1 to 4 carbon atoms.

References Cited
UNITED STATES PATENTS

| | | |
|---|---|---|
| 2,407,508 | 9/1946 | Morris et al. _____ 260—598 X |
| 2,761,879 | 9/1956 | Soloway. |
| 3,298,998 | 1/1967 | McConnell et al. ____ 260—619 |

LEON ZITVER, Primary Examiner

N. P. MORGENSTERN, Assistant Examiner

U.S. Cl. X.R.

117—161; 260—47, 346.2

PO-1050
(5/69)

UNITED STATES PATENT OFFICE
CERTIFICATE OF CORRECTION

Patent No. 3,517,071      Dated June 23, 1970

Inventor(s) John R. Caldwell and Winston J. Jackson, Jr.

It is certified that error appears in the above-identified patent and that said Letters Patent are hereby corrected as shown below:

Column 1, line 19, "proved temperature" should read ---proved high temperature---. Column 1, line 36, "Agnew" should read ---Angew---.

Column 2, lines 60-65, the formula should read as shown below:

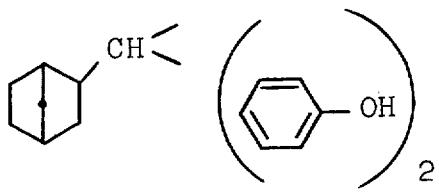

Column 5, line 17, "inventon" should read ---invention---. Column 8, line 3, "M.P." should read ---m.p.---. Column 8, line 9, "$CH_a$" should read ---$CH_3$---. Column 8, line 14, "R-Cl)," should read ---R" = Cl),---. Column 9, lines 57-59, should be changed to read ---mixture and melted at 222-224°C.
     4,4'-(3-Phenyl-2-norbornylmethylene)diphenol (XII), R=H, R' = $C_6H_5$) melted at 195-198°C.---.
Column 10, line 55, "gorups" should read ---groups---.

Column 10, line 71, "(R=H)." should read ---(XV, R=H).---. Column 12, line 6, "4,4" should read ---4,4'---. Column 12, line 62, "5,8'" should read ---5,8---. Column 13, line 29, "XXIV" should read ---XXIX---.

UNITED STATES PATENT OFFICE
CERTIFICATE OF CORRECTION

Patent No. 3,517,071      Dated June 23, 1970

Inventor(s) John R. Caldwell and Winston J. Jackson, Jr.

It is certified that error appears in the above-identified patent and that said Letters Patent are hereby corrected as shown below:

- 2 -

Column 15, lines 58-65, the formula should read as shown below:

Column 16, lines 45-50, the formula should read as shown below:

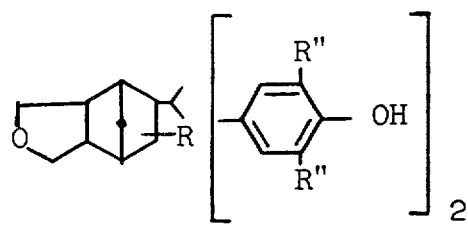

Column 17, lines 5-24, the formulas should read as shown below:

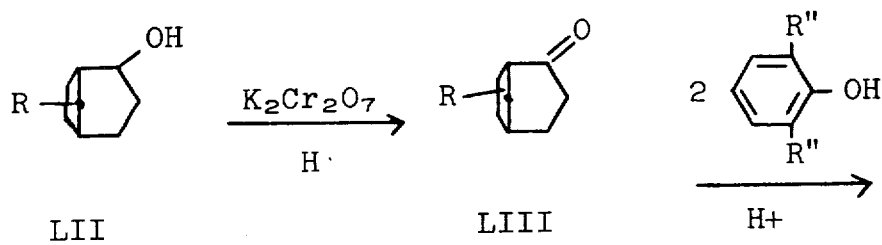

UNITED STATES PATENT OFFICE
CERTIFICATE OF CORRECTION

Patent No. 3,517,071    Dated June 23, 1970

Inventor(s) John R. Caldwell and Winston J. Jackson, Jr.

It is certified that error appears in the above-identified patent and that said Letters Patent are hereby corrected as shown below:

- 3 -

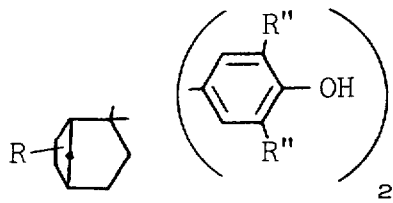

LIV

Column 17, line 41, "(LIV, R" = C)" should read ---(LIV, R" = Cl)---.

Column 17, lines 54-59, the formula should read as shown below:

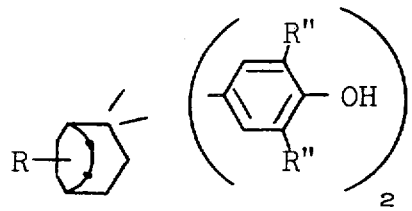

Column 19, line 47, "$[2.2.1^{2,6}]$" should read ---$[2.2.1.0^{2,6}]$---.

Column 19, lines 50-56, the formula should read as shown below:

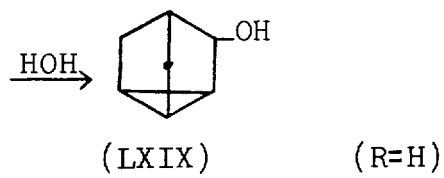

(LXIX)    (R=H)

UNITED STATES PATENT OFFICE
CERTIFICATE OF CORRECTION

Patent No. 3,517,071      Dated June 23, 1970

Inventor(s) John R. Caldwell and Winston J. Jackson, Jr.

It is certified that error appears in the above-identified patent and that said Letters Patent are hereby corrected as shown below:

- 4 -

Column 20, line 35, "-C=C-," should read --- -C≡C-,---.
Column 21, line 55, "4,4'-dihydroxyphenyl" should read ---4,4'-dihydroxydiphenyl---. Column 24, line 74, "transision" should read ---transition---. Column 25, line 11, "200" should read ---2000---. Above the table in columns 25 and 26, please insert:

---TABLE 1
Properties of Polycarbonates From Polycyclic Bisphenols---

Column 32, lines 5-10, the formulas should read as shown below:

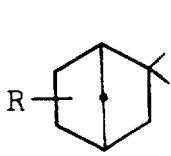 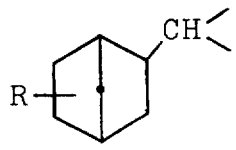 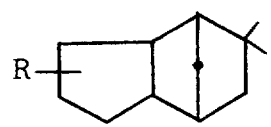

Column 32, lines 25-30, the formula should read as shown below:

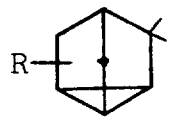

NOV 5 1970

(SEAL)
Attest:
Edward M. Fletcher, Jr.
Attesting Officer

WILLIAM E. SCHUYLER, JR.
Commissioner of Patents